(12) United States Patent
Geng et al.

(10) Patent No.: US 11,690,116 B2
(45) Date of Patent: Jun. 27, 2023

(54) COMMUNICATION METHOD, COMMUNICATIONS APPARATUS, AND STORAGE MEDIUM

(71) Applicant: Huawei Technologies Co., Ltd., Shenzhen (CN)

(72) Inventors: Tingting Geng, Shanghai (CN); Yinghao Jin, Shanghai (CN); Hongping Zhang, Shanghai (CN); Le Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 17/104,633

(22) Filed: Nov. 25, 2020

(65) Prior Publication Data
US 2021/0112614 A1 Apr. 15, 2021

Related U.S. Application Data

(63) Continuation of application No. PCT/CN2019/089312, filed on May 30, 2019.

(30) Foreign Application Priority Data

May 30, 2018 (CN) .......................... 201810542736.X

(51) Int. Cl.
*H04W 76/15* (2018.01)
*H04W 76/19* (2018.01)
(Continued)

(52) U.S. Cl.
CPC ........... *H04W 76/15* (2018.02); *H04W 48/18* (2013.01); *H04W 76/11* (2018.02); *H04W 76/19* (2018.02)

(58) Field of Classification Search
CPC ............ H04W 36/00; H04W 36/0033; H04W 36/005; H04W 36/08; H04W 48/18;
(Continued)

(56) References Cited

U.S. PATENT DOCUMENTS 6,285,667 B1 * 9/2001 Willars ................. H04W 68/00
370/465
10,560,882 B2 * 2/2020 Vrzic ................ H04W 36/0066
(Continued)

FOREIGN PATENT DOCUMENTS

| CN | 102348191 A | 2/2012 |
|----|-------------|--------|
| CN | 104349419 A | 2/2015 |

(Continued)

OTHER PUBLICATIONS

Samsung, "Remaining issues on suspension to INACTIVE in MR dual connectivity," 3GPP TSG-RAN WG2 #100, Reno, USA, Nov. 27-Dec. 1, 2017, R2-1713773, 4 pages.

*Primary Examiner* — Jean A Gelin
(74) *Attorney, Agent, or Firm* — Slater Matsil, LLP

(57) ABSTRACT

Embodiments of this application provide a communication method, a communications apparatus, and a storage medium. The communication method includes: sending, by a new master network device, a request to an original master network device, to request context information of a terminal device on the original master network device and an original secondary network device; and receiving the context information of the terminal device on the original master network device and the original secondary network device from the original master network device. This application can effectively simplify implementation steps of resuming a multi-connectivity mode by the terminal device, reduce signaling procedures, and shorten a delay, thereby improving network transmission efficiency.

17 Claims, 13 Drawing Sheets

(51) Int. Cl.
*H04W 76/11* (2018.01)
*H04W 48/18* (2009.01)

(58) Field of Classification Search
CPC ..... H04W 68/00; H04W 68/02; H04W 68/08; H04W 76/11; H04W 76/15; H04W 76/19; H04W 76/27
See application file for complete search history.

(56) References Cited

U.S. PATENT DOCUMENTS

| | | | | |
|---|---|---|---|---|
| 2006/0176872 | A1* | 8/2006 | Serna | H04W 40/36 370/351 |
| 2006/0218419 | A1* | 9/2006 | Iwamura | G06F 1/329 713/300 |
| 2011/0274030 | A1* | 11/2011 | Wang | H04W 24/02 370/315 |
| 2012/0113835 | A1* | 5/2012 | Alon | H04L 45/58 370/252 |
| 2013/0268654 | A1* | 10/2013 | Abraham | H04W 40/246 709/224 |
| 2015/0017976 | A1* | 1/2015 | Liu | H04W 76/19 455/423 |
| 2016/0183322 | A1 | 6/2016 | Huang | |
| 2017/0005915 | A1* | 1/2017 | Mirsky | H04L 45/28 |
| 2017/0188248 | A1* | 6/2017 | Müller | H04L 43/0864 |
| 2017/0251357 | A1* | 8/2017 | Iwai | H04W 4/00 |
| 2018/0270895 | A1* | 9/2018 | Park | H04W 76/38 |
| 2018/0295603 | A1* | 10/2018 | Saily | H04W 68/005 |
| 2018/0332657 | A1* | 11/2018 | Fan | H04W 76/15 |
| 2018/0337845 | A1* | 11/2018 | Matsunaga | H04L 45/12 |
| 2019/0045408 | A1 | 2/2019 | Kim et al. | |
| 2019/0116527 | A1* | 4/2019 | Ke | H04W 36/0069 |
| 2019/0246434 | A1 | 8/2019 | Tang et al. | |
| 2019/0297660 | A1* | 9/2019 | Shaikh | H04W 8/24 |
| 2020/0128603 | A1* | 4/2020 | Liu | H04W 68/005 |
| 2020/0187064 | A1* | 6/2020 | Susitaival | H04W 36/08 |
| 2020/0260325 | A1* | 8/2020 | Futaki | H04W 28/0967 |
| 2020/0351722 | A1* | 11/2020 | Yang | H04W 36/08 |
| 2021/0034731 | A1* | 2/2021 | Wright | B64D 11/0624 |
| 2021/0274583 | A1* | 9/2021 | Rugeland | H04W 12/02 |
| 2021/0345139 | A1* | 11/2021 | Pradas | H04W 76/15 |
| 2021/0368467 | A1* | 11/2021 | Yang | H04W 60/005 |
| 2022/0030444 | A1* | 1/2022 | Hu | H04W 24/02 |

FOREIGN PATENT DOCUMENTS

| | | |
|---|---|---|
| CN | 105981438 A | 9/2016 |
| CN | 107623946 A | 1/2018 |
| CN | 107666693 A | 2/2018 |
| WO | 2017188787 A2 | 11/2017 |
| WO | 2018072651 A1 | 4/2018 |

\* cited by examiner

COMMUNICATION METHOD, COMMUNICATIONS APPARATUS, AND STORAGE MEDIUM

CROSS-REFERENCE TO RELATED APPLICATIONS

This application is a continuation of International Patent Application No. PCT/CN2019/089312, filed on May 30, 2019, which claims priority to Chinese Patent Application No. 201810542736.X, filed on May 30, 2018. The disclosures of the aforementioned applications are hereby incorporated by reference in their entireties.

TECHNICAL FIELD

Embodiments of this application relate to communications technologies, and in particular, to a communication method, a communications apparatus, and a storage medium.

BACKGROUND

A bandwidth resource and coverage of a single network device are limited. Therefore, radio resources of a plurality of cells or network devices are centralized to provide a service for a user, so that a capacity requirement and a coverage requirement of the user can be satisfied. This manner may be referred to as a multi-connection mode, for example, a dual-connection mode. In the multi-connection mode, a terminal device may establish connections to a plurality of network devices, and perform data communication. The plurality of network devices include one master network device and at least one secondary network device. If the terminal device in the multi-connection mode has not performed data communication within a specific period of time, the master network device initiates a suspend request to the terminal device, to control the terminal device to switch from a connected state to an inactive state (inactive state), so that the terminal device is disconnected from all the network devices.

If a terminal device in the inactive state needs to perform data communication, the terminal device needs to initiate a resume request to a network device corresponding to a current cell. The network device corresponding to the current cell serves as a new master network device to establish a connection to the terminal device, and allocates a secondary network device to the terminal device. The terminal device may obtain context information of the terminal device by establishing a session connection to the new secondary network device, and send the context information to the new master network device. After obtaining the context information of the terminal device, the new master network device may control the terminal device to resume the multi-connection mode.

It can be learned from the foregoing that implementation steps of resuming the multi-connection mode by the terminal device are relatively complex, there are a relatively large quantity of signaling procedures, and a delay is relatively long. Consequently, network transmission efficiency is low.

SUMMARY

This application provides a communication method, a communications apparatus, and a storage medium, to simplify implementation steps of resuming a multi-connection mode by a terminal device, reduce signaling procedures, shorten a delay, and improve network transmission efficiency.

According to a first aspect, a communication method is provided. The method includes: sending, by a first network device, a first request to a second network device, where the first request is used to request context information of a terminal device on the second network device and a third network device, the second network device is an original master network device of the terminal device in a connected state, and the third network device is an original secondary network device of the terminal device in the connected state; and receiving, by the first network device, the context information of the terminal device on the second network device and the third network device from the second network device.

In this method, the first network device, that is, a new master network device of the terminal device, may obtain the context information of the terminal device on the original master network device and the original secondary network device, to resume a multi-connection mode of the terminal device. In this way, implementation steps of resuming the multi-connection mode of the terminal device are effectively simplified, signaling procedures are reduced, and a delay is shortened, thereby improving network transmission efficiency.

In a possible implementation, the first request includes: request indication information, where the request indication information is used to request the context information of the terminal device on the second network device and the third network device, or request the context information of the terminal device on the third network device.

In a possible implementation, the method further includes: receiving, by the first network device, a second request sent by the terminal device, where the second request includes measurement indication information, and the measurement indication information is used to indicate a cell satisfying a report threshold; and determining, by the first network device, a fourth network device as a new secondary network device based on the measurement indication information.

In a possible implementation, the measurement indication information includes identity information of the cell satisfying the report threshold.

In a possible implementation, the measurement indication information includes an index of the cell satisfying the report threshold or information indicating whether at least one cell satisfies the report threshold.

In a possible implementation, the method further includes: sending, by the first network device to the second network device, the index of the cell satisfying the report threshold; or sending, by the first network device to the second network device, the information indicating whether the at least one cell satisfies the report threshold.

In a possible implementation, the method further includes: receiving, by the first network device from the second network device, identity information of the cell satisfying the report threshold.

In a possible implementation, the measurement indication information further includes information used to indicate a measurement result corresponding to the cell satisfying the report threshold.

In a possible implementation, the measurement indication information further includes the report threshold.

In a possible implementation, the method further includes: receiving, by the first network device from the second network device, information used to indicate the report threshold, where the information used to indicate the report threshold may be a value of the report threshold, an index of the report threshold, or the like.

In a possible implementation, the fourth network device is the third network device, and the method further includes: sending, by the first network device, a third request to the fourth network device, where the third request includes an identifier of the terminal device, and the third request is used to request the fourth network device to resume a connection to the terminal device based on the context information of the terminal device on the third network device.

In a possible implementation, the fourth network device is different from the third network device, and the method further includes: sending, by the first network device, a fourth request to the fourth network device, where the fourth request includes an identifier of the terminal device and the context information of the terminal device on the third network device, where the context information of the terminal device on the third network device is used to establish a connection between the fourth network device and the terminal device.

In a possible implementation, the method further includes: sending, by the first network device, a response to the terminal device, where the response includes information about a new secondary cell, the new secondary cell is a cell served by the fourth network device, and the information about the new secondary cell is used for adding, activating, or modifying a secondary cell of the terminal device.

According to a second aspect, a communication method is further provided. The method includes: receiving, by a second network device, a first request from a first network device, where the first request is used to request context information of a terminal device on the second network device and a third network device, the second network device is an original master network device of the terminal device in a connected state, and the third network device is an original secondary network device of the terminal device in the connected state; and sending, by the second network device, the context information of the terminal device on the second network device and the third network device to the first network device.

In a possible implementation, the first request includes: request indication information, where the request indication information is used to request the context information of the terminal device on the second network device and the third network device, or request the context information of the terminal device on the third network device.

In a possible implementation, the method further includes: receiving, by the second network device from the first network device, an index of a cell satisfying a report threshold; or receiving, by the second network device from the first network device, information indicating whether at least one cell satisfies the report threshold.

In a possible implementation, the method further includes: sending, by the second network device to the first network device, identity information of the cell satisfying the report threshold.

In a possible implementation, the method further includes: sending, by the second network device to the first network device, information used to indicate the report threshold.

According to a third aspect, a communication method is further provided. The method includes: sending, by a terminal device, a request to a first network device, where the request includes measurement indication information, the measurement indication information is used to indicate a cell satisfying a report threshold, and the measurement indication information is used to determine a new secondary cell establishing a connection to a terminal device; receiving, by the terminal device, a response from the first network device, where the response includes information about the new secondary cell; and adding, modifying, or activating, by the terminal device, the new secondary cell based on the included information about the new secondary cell.

In a possible implementation, the measurement indication information includes identity information of the cell satisfying the report threshold.

In a possible implementation, the measurement indication information includes an index of the cell satisfying the report threshold or information indicating whether at least one cell satisfies the report threshold.

In a possible implementation, the measurement indication information further includes the report threshold.

According to a fourth aspect, a communication method is further provided. The method includes: sending, by a first network device, a first request to a second network device, where the first request is used to request context information of a terminal device on the second network device, the second network device is an original master network device of the terminal device in a connected state, the first network device is a third network device, and the third network device is an original secondary network device of the terminal device in the connected state; and receiving, by the first network device, the context information of the terminal device on the second network device and context information of the terminal device on the third network device from the second network device.

In a possible implementation, the first request includes request indication information; and the request indication information is used to request the context information of the terminal device on the second network device.

In a possible implementation, the method further includes: receiving, by the first network device, a second request sent by the terminal device, where the second request includes measurement indication information, and the measurement indication information is used to indicate a cell satisfying a report threshold; and selecting, by the first network device based on the measurement indication information, a fourth network device from at least one network device corresponding to the cell satisfying the report threshold, as a new secondary network device of the terminal device.

In a possible implementation, the measurement indication information includes identity information of the cell satisfying the report threshold.

In a possible implementation, the measurement indication information includes an index of the cell satisfying the report threshold or information indicating whether at least one cell satisfies the report threshold.

In a possible implementation, the method further includes: sending, by the first network device to the second network device, the index of the cell satisfying the report threshold; or sending, by the first network device to the second network device, the information indicating whether the at least one cell satisfies the report threshold.

In a possible implementation, the method further includes: receiving, by the first network device from the second network device, identity information of the cell satisfying the report threshold.

In a possible implementation, the measurement indication information further includes information used to indicate a measurement result corresponding to the cell satisfying the report threshold.

In a possible implementation, the measurement indication information further includes the report threshold.

In a possible implementation, the method further includes: receiving, by the first network device from the second network device, information used to indicate the report threshold.

In a possible implementation, the method further includes: sending, by the first network device, a fourth request to the fourth network device, where the fourth request includes an identifier of the terminal device and the context information of the terminal device on the third network device, where the context information of the terminal device on the third network device is used to establish a connection between the fourth network device and the terminal device.

In a possible implementation, the method further includes: sending, by the first network device, a response to the terminal device, where the response includes information about a new secondary cell, and the new secondary cell is served by the fourth network device, where the information about the new secondary cell is used to add, activate, or modify the new secondary cell of the terminal device.

According to a fifth aspect, a communication method is further provided. The method includes: receiving, by a second network device, a first request from a first network device, where the first request is used to request context information of a terminal device on the second network device, the second network device is an original master network device of the terminal device in a connected state, the first network device is a third network device, and the third network device is an original secondary network device of the terminal device in the connected state; and sending, by the second network device, the context information of the terminal device on the second network device to the first network device.

In a possible implementation, the first request includes: request indication information, where the request indication information is used to request the context information of the terminal device on the second network device.

In a possible implementation, the method further includes: receiving, by the second network device from the first network device, an index of a cell satisfying a report threshold; or receiving, by the second network device from the first network device, information indicating whether at least one cell satisfies the report threshold.

In a possible implementation, the method further includes: sending, by the second network device to the first network device, identity information of the cell satisfying the report threshold.

In a possible implementation, the method further includes: sending, by the second network device to the first network device, information used to indicate the report threshold.

According to a sixth aspect, a communication method is further provided. The method includes: receiving, by a first network device, a first request from a second network device, where the first request is used to page a terminal device, and the second network device is an original master network device of the terminal device in a connected state; and sending, by the first network device, a response to the second network device, where the response is used to indicate that the first network device has successfully paged the terminal device, in other words, a paging response of the terminal device is received.

In a possible implementation, the method further includes: receiving, by the first network device, to-be-transmitted data of the terminal device on a third network device from the third network device, where the third network device is an original secondary network device of the terminal device in the connected state.

In the method, the third network device may page the terminal device via a network device serving a cell that the terminal device currently camps on, namely, the first network device, and then transmit the to-be-transmitted data to the first network device. In this way, when the to-be-transmitted data of the terminal device in the inactive state needs to be transmitted on the original secondary network device, transmission of the to-be-transmitted data is implemented.

In a possible implementation, if there is no connection interface between the first network device and the third network device, the receiving, by the first network device, to-be-transmitted data of the terminal device on a third network device from the third network device includes: receiving, by the first network device, the to-be-transmitted data transmitted by the third network device via the second network device.

In a possible implementation, the method further includes: sending, by the first network device, a second request to the second network device, where the second request is used to request context information of the terminal device on the second network device and the third network device; and receiving, by the first network device, the context information of the terminal device on the second network device from the second network device and rejection indication information from the second network device, where the rejection indication information is used to indicate that the context information of the terminal device on the third network device is not provided.

In a possible implementation, the rejection indication information is further used to indicate that there is no interface between the third network device and the second network device.

In a possible implementation, the method further includes: establishing, by the first network device, a connection to the terminal device based on the context information of the terminal device on the second network device; and sending, by the first network device, the to-be-transmitted data to the terminal device.

In a possible implementation, if there is an interface between the first network device and the third network device, the receiving, by the first network device, to-be-transmitted data of the terminal device on a third network device from the third network device includes: receiving, by the first network device, the to-be-transmitted data sent by the third network device after the third network device establishes a connection to the first network device.

In a possible implementation, the method further includes: sending, by the first network device, a third request to the second network device, where the third request is used to request the context information of the terminal device on the second network device; and receiving, by the first network device, the context information of the terminal device on the second network device from the second network device.

In a possible implementation, the method further includes: establishing, by the first network device, a connection to the terminal device based on the context information of the terminal device on the second network device; and sending, by the first network device, the to-be-transmitted data to the terminal device.

According to a seventh aspect, a communication method is further provided. The method includes: sending, by a second network device, a first request to a first network device, where the first request is used to page a terminal device, and the second network device is an original master network device of the terminal device in a connected state; and receiving, by the second network device, a response from the first network device, where the response is used to indicate that the first network device has successfully paged the terminal device, in other words, the first network device has received a paging response of the terminal device.

In a possible implementation, the method further includes: receiving, by the second network device, a second request from the first network device, where the second request is used to request context information of the terminal device on the second network device and a third network device, and the third network device is an original secondary network device of the terminal device in the connected state; and sending, by the second network device, the context information of the terminal device on the second network device and rejection indication information to the first network device, where the rejection indication information is used to indicate that the context information of the terminal device on the third network device is not provided.

In a possible implementation, the rejection indication information is further used to indicate that there is no interface between the third network device and the second network device.

In a possible implementation, the method further includes: receiving, by the second network device, a third request from the first network device, where the third request is used to request the context information of the terminal device on the second network device; and sending, by the second network device, the context information of the terminal device on the second network device to the first network device.

According to an eighth aspect, a communication method is further provided. The method includes: receiving, by a first network device, first indication information from a second network device, where the first indication information includes information used to determine a third network device, the second network device is an original master network device of a terminal device in a connected state, and the third network device is an original secondary network device of the terminal device in the connected state; using, by the first network device, the third network device as a new secondary network device of the terminal device based on the first indication information; and sending, by the first network device, second indication information to the third network device, where the second indication information is used to indicate that the third network device is the new secondary network device of the terminal device.

The information used to determine the third network device may include identity information of the third network device and/or information about a cell served by the third network device.

In a possible implementation, the method further includes: sending, by the first network device, a first request to the second network device, where the first request is used to request context information of the terminal device on the second network device; and receiving, by the first network device, the context information of the terminal device on the second network device from the second network device.

In a possible implementation, the first indication information and the context information of the terminal device on the second network device are in a same message.

In a possible implementation, the method further includes: receiving, by the first network device, a second request sent by the second network device, where the second request is used to page the terminal device; and sending, by the first network device, a response to the second network device, where the response is used to indicate that the first network device has successfully paged the terminal device, in other words, the first network device has received a paging response of the terminal device.

According to a ninth aspect, a communications apparatus is further provided. The apparatus is configured to perform the communication method according to any one of the first aspect or the possible implementations of the first aspect.

According to a tenth aspect, a communications apparatus is further provided. The apparatus is configured to perform the communication method according to any one of the second aspect or the possible implementations of the second aspect.

According to an eleventh aspect, a communications apparatus is further provided. The apparatus is configured to perform the communication method according to any one of the third aspect or the possible implementations of the third aspect.

According to a twelfth aspect, a communications apparatus is further provided. The apparatus is configured to perform the communication method according to any one of the fourth aspect or the possible implementations of the fourth aspect.

According to a thirteenth aspect, a communications apparatus is further provided. The apparatus is configured to perform the communication method according to any one of the fifth aspect or the possible implementations of the fifth aspect.

According to a fourteenth aspect, a communications apparatus is further provided. The apparatus is configured to perform the communication method according to any one of the sixth aspect or the possible implementations of the sixth aspect.

According to a fifteenth aspect, a communications apparatus is further provided. The apparatus is configured to perform the communication method according to any one of the seventh aspect or the possible implementations of the seventh aspect.

According to a sixteenth aspect, a communications apparatus is further provided. The apparatus is configured to perform the communication method according to any one of the eighth aspect or the possible implementations of the eighth aspect.

In a possible design, the apparatus includes one or more processors and a communications unit. The one or more processors are configured to support the apparatus in performing the corresponding function of the network device in the foregoing methods, for example, generating the first indication information. The communications unit is configured to support the apparatus in communicating with another device, to implement a receiving function and/or a sending function, for example, sending the first indication information.

Optionally, the apparatus may further include one or more memories, the memory is configured to couple to the processor, and the memory stores a program instruction and/or data that are/is necessary for the network device. The one or more memories may be integrated with the processor, or may be disposed independent of the processor. This is not limited in this application.

The apparatus may be a base station, a gNB, a TRP, or the like. The communications unit may be a transceiver or a transceiver circuit. Optionally, the transceiver may alternatively be an input/output circuit or an interface.

The apparatus may alternatively be a communications chip. The communications unit may be an input/output circuit or interface of the communications chip.

In another possible design, the apparatus includes a transceiver, a processor, and a memory. The processor is configured to control the transceiver to receive and send a signal. The memory is configured to store a computer program. The processor is configured to run the computer program in the memory, so that the apparatus performs the communication method completed by the network device according to any one of the first aspect, the second aspect, the fourth aspect to the eighth aspect, or the possible implementations of the foregoing aspects.

In a possible design, the apparatus includes one or more processors and a communications unit. The one or more processors are configured to support the apparatus in performing the corresponding function of the terminal device in the foregoing methods, for example, determining a second parameter. The communications unit is configured to support the apparatus in communicating with another device, to implement a receiving function and/or a sending function, for example, receiving the first indication information.

Optionally, the apparatus may further include one or more memories. The memory is configured to couple to the processor, and the memory stores a program instruction and/or data that are/is necessary for the apparatus. The one or more memories may be integrated with the processor, or may be disposed independent of the processor. This is not limited in this application.

The apparatus may be a terminal device such as an intelligent terminal or a wearable device. The communications unit may be a transceiver or a transceiver circuit. Optionally, the transceiver may alternatively be an input/output circuit or an interface.

The apparatus may alternatively be a communications chip. The communications unit may be an input/output circuit or interface of the communications chip.

In another possible design, the apparatus includes a transceiver, a processor, and a memory. The processor is configured to control the transceiver to receive and send a signal, and the memory is configured to store a computer program. The processor is configured to run the computer program in the memory, so that the apparatus performs the communication method performed by the terminal device according to any one of the third aspect or the possible implementations of the third aspect.

According to a seventeenth aspect, a system is provided. The system includes the foregoing terminal device and the foregoing network device.

According to an eighteenth aspect, a computer-readable storage medium is provided and is configured to store a computer program. The computer program includes an instruction used to perform the method according to any one of the first aspect or the possible implementations of the first aspect.

According to a nineteenth aspect, a computer-readable storage medium is provided and is configured to store a computer program. The computer program includes an instruction used to perform the method according to any one of the second aspect or the possible implementations of the second aspect.

According to a twentieth aspect, a computer-readable storage medium is provided and is configured to store a computer program. The computer program includes an instruction used to perform the method according to any one of the third aspect or the possible implementations of the third aspect.

According to a twenty-first aspect, a computer-readable storage medium is provided and is configured to store a computer program. The computer program includes an instruction used to perform the method according to any one of the fourth aspect or the possible implementations of the fourth aspect.

According to a twenty-second aspect, a computer-readable storage medium is provided and is configured to store a computer program. The computer program includes an instruction used to perform the method according to any one of the fifth aspect or the possible implementations of the fifth aspect.

According to a twenty-third aspect, a computer-readable storage medium is provided and is configured to store a computer program. The computer program includes an instruction used to perform the method according to any one of the sixth aspect or the possible implementations of the sixth aspect.

According to a twenty-fourth aspect, a computer-readable storage medium is provided and is configured to store a computer program. The computer program includes an instruction used to perform the method according to any one of the seventh aspect or the possible implementations of the seventh aspect.

According to a twenty-fifth aspect, a computer-readable storage medium is provided and is configured to store a computer program. The computer program includes an instruction used to perform the method according to any one of the eighth aspect or the possible implementations of the eighth aspect.

According to a twenty-sixth aspect, a computer program product is provided. The computer program product includes computer program code. When the computer program code is run on a computer, the computer is enabled to perform the method according to any one of the first aspect or the possible implementations of the first aspect.

According to a twenty-seventh aspect, a computer program product is provided. The computer program product includes computer program code. When the computer program code is run on a computer, the computer is enabled to perform the method according to any one of the second aspect or the possible implementations of the second aspect.

According to a twenty-eighth aspect, a computer program product is provided. The computer program product includes computer program code. When the computer program code is run on a computer, the computer is enabled to perform the method according to any one of the third aspect or the possible implementations of the third aspect.

According to a twenty-ninth aspect, a computer program product is provided. The computer program product includes computer program code. When the computer program code is run on a computer, the computer is enabled to perform the method according to any one of the fourth aspect or the possible implementations of the fourth aspect.

According to a thirtieth aspect, a computer program product is provided. The computer program product includes computer program code. When the computer program code is run on a computer, the computer is enabled to perform the method according to any one of the fifth aspect or the possible implementations of the fifth aspect.

According to a thirty-first aspect, a computer program product is provided. The computer program product includes computer program code. When the computer program code is run on a computer, the computer is enabled to perform the method according to any one of the sixth aspect or the possible implementations of the sixth aspect.

According to a thirty-second aspect, a computer program product is provided. The computer program product includes computer program code. When the computer program code is run on a computer, the computer is enabled to perform the method according to any one of the seventh aspect or the possible implementations of the seventh aspect.

According to a thirty-third aspect, a computer program product is provided. The computer program product includes computer program code. When the computer program code is run on a computer, the computer is enabled to perform the method according to any one of the eighth aspect or the possible implementations of the eighth aspect.

According to the communication method, the communications apparatus, and the storage medium that are provided in the embodiments of this application, the first network device may send the first request to the second network device to request the context information of the terminal device on the second network device and/or the third network device, and receive the context information of the terminal device on the second network device and/or the third network device from the second network device. The second network device is the original master network device of the terminal device in the connected state, and the third network device may be the original secondary network device of the terminal device in the connected state. In this method, the first network device, that is, the new master network device of the terminal device, may obtain the context information of the terminal device on the original master network device and the original secondary network device, to resume the multi-connection mode of the terminal device. In this way, implementation steps of resuming the multi-connection mode of the terminal device are effectively simplified, signaling procedures are reduced, and a delay is shortened, thereby improving the network transmission efficiency.

DETAILED DESCRIPTION OF ILLUSTRATIVE EMBODIMENTS

Figure 1:
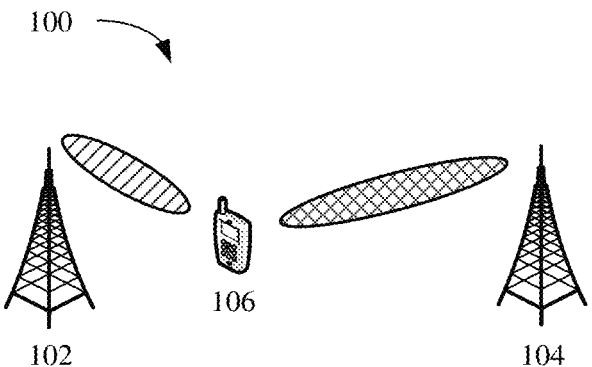
FIG. 1 is a schematic diagram of a communications system of a communication method according to an embodiment of this application.

The following describes technical solutions of this application with reference to the accompanying drawings.

The technical solutions in embodiments of this application may be applied to various communications systems, for example, a long term evolution (LTE) system, a worldwide interoperability for microwave access (WiMAX) communications system, a 5th generation (5G) system such as a new generation radio access technology (NR), and a future communications system such as a 6G system.

All aspects, embodiments, or features are presented in this application by describing a system that may include a plurality of devices, components, modules, and the like. It should be appreciated and understood that each system may include another device, component, module, and the like, and/or may include none of the devices, components, modules, and the like discussed with reference to the accompanying drawings. In addition, a combination of these solutions may further be used.

[oils] In addition, the term "for example" in the embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

In the embodiments of this application, "information", "signal", "message", or "channel" may be interchangeably used sometimes. It should be noted that meanings expressed by the terms are consistent when differences of the terms are not emphasized. The terms "of (of)", "corresponding (corresponding, relevant)", and "corresponding to (corresponding)" may be interchangeably used sometimes. It should be noted that meanings expressed by the terms are consistent when differences of the terms are not emphasized.

In the embodiments of this application, sometimes a subscript such as $W_1$ may be written in an incorrect form such as W1. Expressed meanings are consistent when differences are not emphasized.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

The embodiments of this application may be applied to a time division duplex (TDD) scenario, or may be applied to a frequency division duplex (FDD) scenario.

The embodiments of this application may be applied to a conventional typical network, or may be applied to a future user equipment (UE) centric (UE-centric) network. A non-cell network architecture is introduced to the UE-centric network. To be specific, a large quantity of small cells are deployed in a specific area to form a hyper cell. Each small cell is a transmission point (Transmission Point TP or Transmission and Reception Point TRP) of the hyper cell, and is connected to a centralized controller (controller). When UE moves in the hyper cell, a network device selects, for the UE in real time, a new sub-cluster (sub-cluster) to serve the UE, thereby avoiding a real cell handover, and implementing service continuity of the UE. The network device includes a wireless network device.

In the embodiments of this application, different network devices may be network devices that have different identifiers, or may be network devices that have a same identifier and that are deployed in different geographical locations. Before the network device is deployed, the network device does not know whether the network device is used in the scenario to which the embodiments of this application are applied. Therefore, the network device such as a base station or a baseband chip should support a method provided in the embodiments of this application before being deployed. It may be understood that, using a base station as an example, identity information of the base station may be an identifier of the base station, an identity of a cell served by the base station, or other identifiers.

In the embodiments of this application, an NR network scenario in a wireless communications network is used to describe some scenarios. It should be noted that the solutions in the embodiments of this application may further be applied to another wireless communications network, and a corresponding name may also be replaced with a name of a corresponding function in the another wireless communications network.

First, for ease of understanding the embodiments of this application, a communications system shown in FIG. 1 is used as an example to describe in detail a communications system to which the embodiments of this application are applicable. FIG. 1 is a schematic diagram of a communications system of a communication method according to an embodiment of this application. As shown in FIG. 1, the communications system 100 includes a network device 102 and a terminal device 106. A plurality of antennas may be configured for the network device 102, and a plurality of antennas may also be configured for the terminal device. Optionally, the communications system may further include a network device 104, and a plurality of antennas may also be configured for the network device 104.

It should be understood that the network device 102 or the network device 104 may further include a plurality of components (for example, a processor, a modulator, a multiplexer, a demodulator, and a demultiplexer) related to signal sending and receiving.

The network device 102 or the network device 104 is a device having a wireless transceiver function or a chip that may be disposed in the device. The network device 102 and the network device 104 may be radio access network (RAN) network elements, and are also referred to as RAN network devices, including but not limited to an evolved NodeB (evolved NodeB, eNB), a radio network controller (RNC), a NodeB (NB), a base station controller (BSC), a base transceiver station (BTS), a home base station (a home evolved NodeB or a home NodeB HNB), a baseband unit (BBU), and an access point (AP), a wireless relay node, a wireless backhaul node, and a transmission point (TRP or TP) in a wireless fidelity (Wi-Fi) system; or may be a gNB or a transmission point (TRP or TP) in a 5G system such as an NR system, and one or a group of antenna panels (including a plurality of antenna panels) of a base station in a 5G system; or may be a network node in a gNB or a transmission point, for example, a baseband unit (BBU) or a distributed unit (DU).

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer; and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling, such as RRC layer signaling or PDCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device 106 may also be referred to as UE, an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet, a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and the chip that can be disposed in the foregoing terminal device are collectively referred to as a terminal device.

In the communications system 100, the network device 102 and the network device 104 each may communicate with a plurality of terminal devices (for example, the terminal device 106 shown in the figure). The network device 102 and the network device 104 may communicate with any quantity of terminal devices similar to the terminal device 106. However, it should be understood that a terminal device communicating with the network device 102 and a terminal device communicating with the network device 104 may be the same or may be different. The terminal device 106 shown in FIG. 1 may communicate with both the network device 102 and the network device 104, but this shows only one possible scenario. In some scenarios, the terminal device 106 may communicate with only the network device 102 or the network device 104. This is not limited in this application.

To implement data transmission between the terminal device 106 and the network device 102 or between the terminal device 106 and the network device 104, the network device 102 and the network device 104 may further be separately connected to a core network device (not shown). The core network device may also be referred to as a core network element. A mode in which the terminal device 106 is connected to both the network device 102 and the network device 104 may be referred to as a DC mode.

It should be understood that FIG. 1 is merely a simplified schematic diagram used as an example for ease of understanding. The communications system may further include another network device or another terminal device, which is not shown in FIG. 1.

The following first describes a technical background related to the embodiments of this application.

An inactive state is used as an RRC state of a terminal device, and is also referred to as an "RRC deactivated state", an "RRC inactive state", or a "deactivated state". Similar to an idle state, in the inactive state, the terminal device also needs to disconnect the RRC connection from a network device, and there is no continuous data communication. However, a difference lies in that in the inactive state, the terminal device and the network device may store context information of the terminal device and the network device further allocates a radio access network notification area (RAN Notification Area) to the terminal device in the inactive state. The network device that configures the terminal device to enter the inactive state and stores the context information of the terminal device is a source network device, or is referred to as an anchor (anchor) network device.

When the terminal device in the inactive state needs to access a network again, the terminal device sends a request to a currently serving network device, so that the currently serving network device obtains the context information of the terminal device to quickly configure the terminal device to enter a connected state from the inactive state.

For a terminal device in a multi-connection mode, for example, in a DC mode, a master network device connected to the terminal device may maintain a control plane connection to a core network device, and at least one cell included in the master network device is a master cell group (MCG). Another network device connected to the terminal device in the DC mode may be referred to as a secondary network device, and at least one cell included in the secondary network device may be a secondary cell group (SCG). The master network device may independently transmit user plane data, the secondary network device may independently transmit user plane data, or the master network device may share transmission of user plane data with the secondary network device. It should be noted that there may be no control plane connection between the secondary network device and the core network device.

The terminal device in the multi-connection mode may enter the inactive state from the connected state when there is no data communication. If the terminal device needs to perform data communication again, the terminal device needs to be resumed from the inactive state to the connected state. To enable the terminal device in the inactive state to resume to the connected state in a multi-connection mode as soon as possible, and improve network transmission efficiency, the embodiments of this application provide the following plurality of communication methods, apparatuses, devices, and storage media.

The following describes the communication method and the communications apparatus in this application by using specific embodiments.

Figure 2:
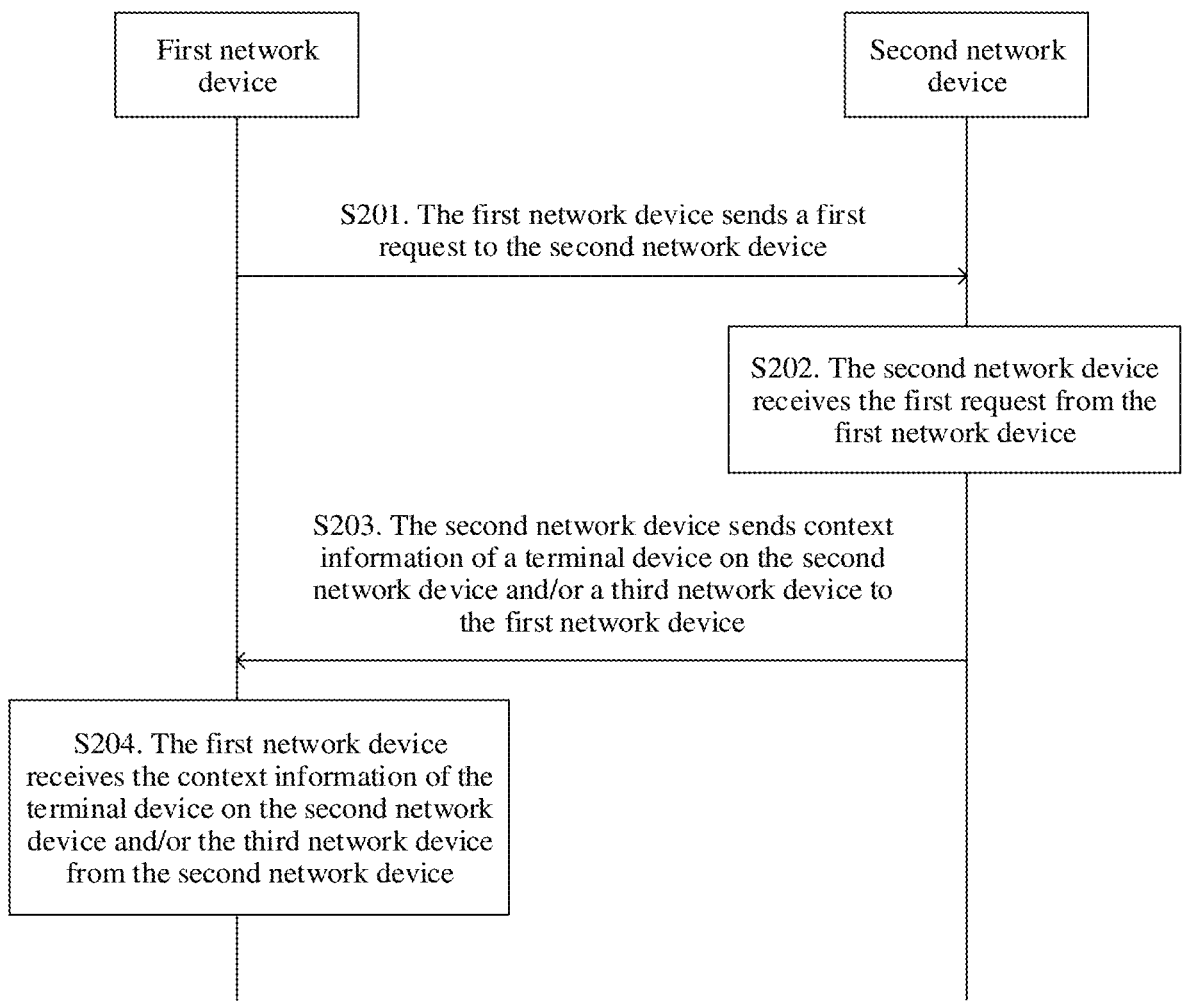
FIG. 2 is a first signaling interaction diagram of a communication method according to an embodiment of this application.

FIG. 2 is a first signaling interaction diagram of a communication method according to an embodiment of this application. As shown in FIG. 2, the method in this embodiment may include the following step:

S201. A first network device sends a first request to a second network device.

The first request is used to request context information of a terminal device on the second network device and/or a third network device.

The context information of the terminal device on the second network device may be multi-connection primary context information of the terminal device, and the context information of the terminal device on the third network device may be multi-connection secondary context information of the terminal device. For explanations of same descriptions in the following, refer to this description. Details are not described again in this application.

The second network device is an original master network device of the terminal device in a connected state, and the third network device is an original secondary network device of the terminal device in the connected state. The original master network device of the terminal device in the connected state may be a master network device connected to the terminal device before the terminal device enters an inactive state. The original secondary network device of the terminal device in the connected state may be a secondary network device connected to the terminal device before the terminal device enters the inactive state.

The first request may be, for example, a retrieve context request of the terminal device, for example, a retrieve user equipment context request (Retrieve UE Context Request).

The first network device may be a network device serving a cell on which the terminal device currently camps, namely, a new master network device of the terminal device.

When the terminal device camps on a cell served by the first network device, the terminal device may initiate an access request to the first network device. For example, when the terminal device has an active service requirement or a passive service requirement, the terminal device initiates the access request to the first network device. In this case, if the first network device determines that the terminal device needs to be resumed from the inactive state to the connected state in a multi-connection mode, for example, a DC mode, the first network device sends the first request to the second network device to obtain the context information of the terminal device on the second network device and the third network device, to resume the connected state in the multi-connection mode based on the context information. It may be understood that the first network device may have partial context information of the terminal device, and needs to obtain only partial context information of the terminal device from the second network device. For example, if the first network device is the third network device, the first network device stores the context information of the terminal device on the third network device. In this case, the first network device only needs to request the context information of the terminal device on the second network device from the second network device.

Optionally, if the first network device is the third network device, the first network device stores the context information of the terminal device on the third network device. In this case, the first network device only needs to request the context information of the terminal device on the second network device from the second network device.

Optionally, if the first network device is different from the second network device and the third network device and the first network device determines to resume the terminal device to the connected state in the multi-connection mode, for example, the DC mode, the first network device requests the context information of the terminal device on the second network device and the third network device from the second network device, or requests the context information of the terminal device on the third network device from the second network device. For example, in this case, it may be considered by default that the first network device always requests the context information of the terminal device on the second network device. Therefore, only whether to request the context information of the terminal device on the third network device may be indicated. Alternatively, the first network device requests the context information of the terminal device from the second network device. For example, the first network device determines to configure the terminal device to be in the multi-connection mode, but the first network device cannot determine whether the terminal device stores multi-connection context information (for example, the terminal device does not indicate, to the first network device, whether the terminal device stores the multi-connection context information, or measurement indication information sent by the terminal device does not indicate that the terminal device stores the multi-connection context information). Therefore, the first network device requests the context information of the terminal device from the second network device. After the second network device receives the request, if the second network device determines that the terminal device works in the multi-connection mode before the terminal device is instructed to enter the inactive state, the second network device may determine that the context information of the terminal device on the third network device is stored or the context information of the terminal device on the third network device is obtained from the third network device. The second network device sends the context information of the terminal device on the second network device and the third network device. In this case, the second network device may further send indication information of the sent context information to the first network device to notify the first network device that the context information sent by the first network device includes the context information of the terminal device on the second network device and the third network device, so that the first network device determines that the terminal device works in the multi-connection mode before the terminal device enters the inactive state. In this way, the first network device may determine that the terminal device stores the multi-connection context information, and may not need to configure original context information for the terminal device subsequently.

It may be understood that, in an implementation, the first network device may determine, based on that the terminal device stores the multi-connection context information, to resume the terminal device to the connected state in the multi-connection mode. In this way, the first network device may more properly determine, based on the information, the context information of the terminal device that is requested from the second network device.

Optionally, if the first network device is different from the second network device, the first network device may receive indication information that is used to indicate whether the terminal device stores the multi-connection context information of the terminal device and that is sent by the terminal device. For example, if the terminal device determines that the terminal device stores the multi-connection context information of the terminal device, the terminal device may determine that at least one network device also stores the multi-connection context information of the terminal device. Correspondingly, when receiving the indication information that indicates that the terminal device stores the multi-connection context information of the terminal device and that is sent by the terminal device, the first network device may determine that at least one network device also stores the multi-connection context information of the terminal device. When the first network device determines to resume the multi-connection mode of the terminal device, the first network device requests the context information of the terminal device on the second network device and the third network device from the second network device. Optionally, the terminal device may send the indication information to the first network device, to indicate whether the terminal device stores the multi-connection context information of the terminal device. The indication information may be one bit. For example, when the one bit is a specific value such as 1, it indicates that the terminal device stores the multi-connection context information; or when the one bit is another specific value such as 0, it indicates that the terminal device does not store the multi-connection context information. Optionally, the indication information may alternatively be measurement indication information, and the measurement indication information is used to indicate a cell satisfying a report threshold. For example, if the terminal device sends the measurement indication information to the first network device, the first network device may determine, based on the measurement indication information, that the terminal device stores the multi-connection context information of the terminal device, and may further determine that at least one network device also stores the multi-connection context information of the terminal device. When determining, based on the indication information, that the terminal device does not store the multi-connection context information, the first network device may perform a subsequent operation based on the prior art. For example, if the first network device determines, based on a network status, to establish a multi-connection to the terminal device, the first network device configures the terminal device to be in the multi-connection mode. After determining a secondary network device and establishing a new connection to the secondary network device, the first network device sends configuration information of a new secondary cell to the terminal device, to configure the terminal device to enter the multi-connection mode.

Optionally, if the first network device is different from the second network device and the third network device and the first network device determines to resume only a non-multi-connection mode of the terminal device, for example, a non-DC mode, the first network device may request only the context information of the terminal device on the second network device from the second network device.

Optionally, the first network device is the second network device, and the second network device has the context information of the terminal device. In this case, if the first network device determines that the terminal device needs to be resumed from the inactive state to a connected state in a single-connection mode, the first network device resumes a connection between the first network device and the terminal device based on the context information of the terminal device on the first network device, in other words, the first network device indicates the terminal device to resume only the connection to the first network device. If the first network device determines that the terminal device needs to be resumed from the inactive state to the connected state in the multi-connection mode and a new secondary network device is a network device other than the third network device, the first network device further needs to obtain the context information of the terminal device on the third network device, so that the first network device may configure, based on the context information of the terminal device on the first network device and the third network device, the terminal device to be resumed to the connected state in the multi-connection mode. It may be understood that if the first network device determines that the first network device has stored the context information of the terminal device on the third network device, the first network device may not need to obtain the context information of the terminal device on the third network device from the third network device.

Optionally, the first request includes request indication information, and the request indication information may be used to request the context information of the terminal device on the second network device and the third network device, the context information of the terminal device on the third network device, the context information of the terminal device, or the context information of the terminal device on the second network device. In an implementation, the request indication information includes two bits. Different values are used to indicate that different context information of the terminal device is requested. In an example manner, 00 is used to indicate that only the context information of the terminal device on the second network device is requested, 01 is used to indicate that only the context information of the terminal device on the third network device is requested, and 10 is used to indicate that the context information of the terminal device on the second network device and the third network device is requested.

Optionally, in another implementation, the request indication information includes first indication information and second indication information. The first indication information is used to indicate whether to request the context information of the terminal device on the third network device, and the second indication information is used to indicate whether to request the context information of the terminal device on the second network device. In other words, the request indication information carried in the first request may be used to request the context information of the terminal device on the second network device and the third network device. For example, the request indication information corresponds to two bits. One bit may be used to indicate whether to request the context information of the terminal device on the second network device, and the other bit may be used to indicate whether to request the context information of the terminal device on the third network device.

In another implementation, the request indication information includes third indication information. The third indication information is used to indicate whether to request the context information of the terminal device on the third network device. For example, when the first network device is different from the second network device, the first network device definitely does not have the context information of the terminal device on the second network device. To resume the multi-connection mode of the terminal device, the context information of the terminal device on the second network device is mandatory. Therefore, the context information of the terminal device on the second network device may be requested by default, and no additional indication is required. In this case, the request indication information may be used to request only the context information of the terminal device on the third network device.

In this communication manner, the first network device may indicate, by using the request indication information carried in the first request sent to the second network device, whether the context information of the terminal device on the third network device needs to be requested, so that unnecessary signaling overheads can be reduced.

It may be understood that, in another implementation, the request indication information includes fourth indication information. The fourth indication information is used to indicate whether to request the context information of the terminal device or whether to configure the terminal device to be in the multi-connection mode. For example, the first network device determines to resume the multi-connection mode of the terminal device, but the first network device cannot determine whether the terminal device stores the multi-connection context information. Therefore, the first network device requests the context information of the terminal device from the second network device. After the second network device receives the request, if the second network device determines that the context information of the terminal device on the third network device is stored or the context information of the terminal device on the third network device is obtained from the third network device, the second network device sends the context information of the terminal device on the second network device and the third network device. In this communication manner, the terminal device may not indicate, to the first network device, whether the terminal device stores the multi-connection context information, so that air interface signaling overheads can be reduced.

Correspondingly, the method may further include the following steps.

S202. The second network device receives the first request from the first network device.

After receiving the first request, the second network device determines, based on the request indication information in the first request, the context information of the terminal device requested by the first network device. For example, if it is determined, based on the request indication information in the first request, that the first network device requests the context information of the terminal device on the third network device, the second network device may determine whether the second network device has the context information of the terminal device on the third network device. If the second network device does not have the context information of the terminal device on the third network device or the second network device does not have all the context information of the terminal device on the third network device, the second network device sends a request to the third network device to request the context information of the terminal device on the third network device. That the second network device does not have all the context information of the terminal device on the third network device may mean that the context information, owned by the second network device, of the terminal device on the third network device is incomplete. For example, the second network device may send a request including an identifier of the terminal device to the third network device to request the context information of the terminal device on the third network device, for example, send the retrieve user equipment context request. The second network device receives, from the third network device, the context information of the terminal device on the third network device.

S203. The second network device sends the context information of the terminal device on the second network device and/or the third network device to the first network device.

The second network device may determine, based on the request indication information in the first request, the context information of the terminal device requested by the first network device, and send the context information of the terminal device to the first network device.

In an implementation process, the second network device may send a first response to the first network device, where the first response includes the context information of the terminal device on the second network device and/or the third network device. The first response may be a retrieve context response of the terminal device, for example, a retrieve user equipment context response (Retrieve UE Context Response).

Correspondingly, the method may further include the following step:

S204. The first network device receives the context information of the terminal device on the second network device and/or the third network device from the second network device.

When obtaining the context information of the terminal device on the second network device and the third network device, the first network device may control, based on the context information of the terminal device on the second network device and the third network device, the terminal device to resume the multi-connection mode. It may be understood that a manner in which the first network device obtains the context information of the terminal device on the second network device and the third network device includes: obtaining the context information of the terminal device on the second network device and the third network device based on the existing context information of the terminal device on the first network device and the context information of the terminal that is requested from the second network device. For example, if the first network device is the third network device, the first network device stores the context information of the terminal device on the third network device. In this case, the first network device only needs to request the context information of the terminal device on the second network device from the second network device.

For example, the first network device may establish a connection between the first network device and the terminal device based on the context information of the terminal device on the second network device. The first network device may further configure a secondary network device, for example, a fourth network device, for the terminal device based on the context information of the terminal device on the third network device.

Optionally, after receiving the context information of the terminal device on the second network device and the third network device from the second network device, the first network device may further send an acknowledgment message to the second network device.

It may be understood that the terminal device and/or the network device may perform some or all of the steps in the foregoing embodiment. These steps or operations are merely examples. In the embodiments of the present invention, other operations or variations of various operations may further be performed. In addition, the steps may be performed in a sequence different from that presented in the foregoing embodiment, and possibly, not all operations in the foregoing embodiment need to be performed.

According to the communication method provided in this embodiment of this application, the first network device may send the first request to the second network device to request the context information of the terminal device on the second network device and/or the third network device, and receive the context information of the terminal device on the second network device and/or the third network device from the second network device. The second network device is the original master network device of the terminal device in the connected state, and the third network device may be the original secondary network device of the terminal device in the connected state. In this method, the first network device, that is, a new master network device of the terminal device, may obtain the context information of the terminal device on the original master network device and the original secondary network device, to resume the multi-connection mode of the terminal device. In this way, implementation steps of resuming the multi-connection mode of the terminal device are effectively simplified, signaling procedures are reduced, and a delay is shortened, thereby improving network transmission efficiency.

Figure 3:
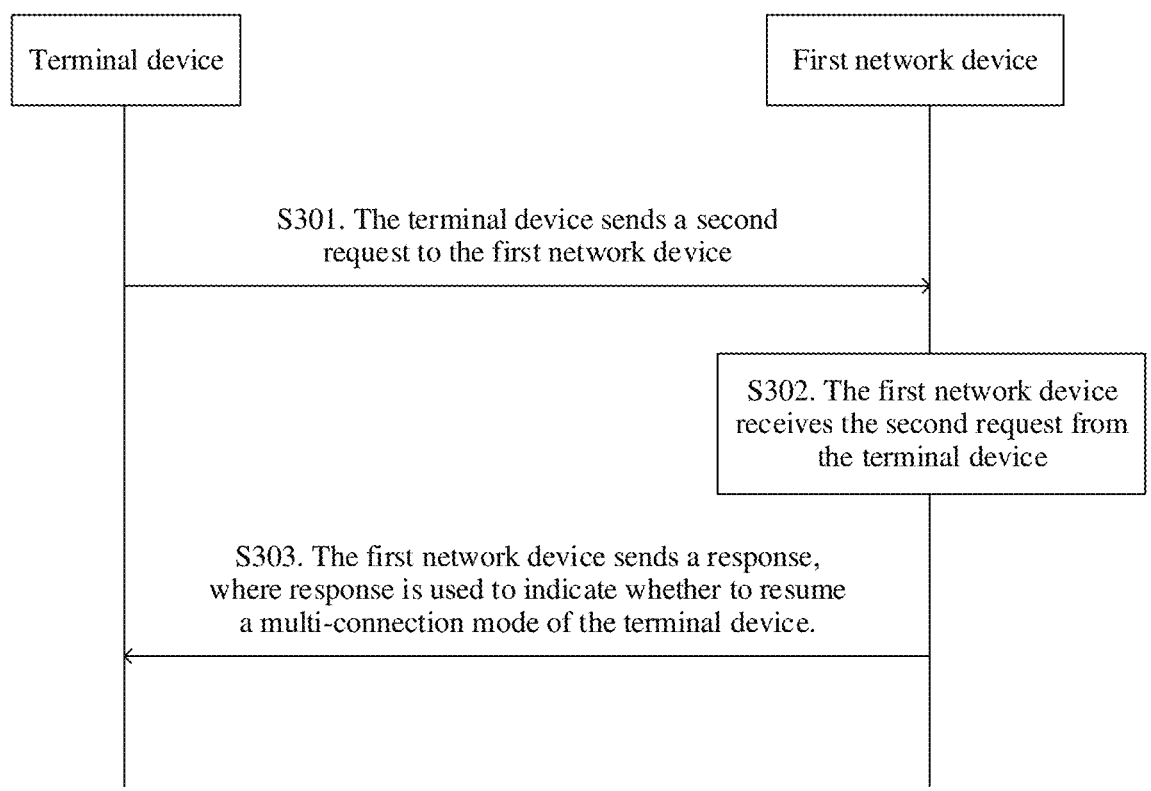
FIG. 3 is a second signaling interaction diagram of a communication method according to an embodiment of this application.

An embodiment of this application may further provide a communication method. FIG. 3 is a second signaling interaction diagram of a communication method according to an embodiment of this application. It may be understood that FIG. 3 may be an independent embodiment, or may be combined with the communication method described in the foregoing embodiment. As shown in FIG. 3, the communication method may include the following steps.

S301. A terminal device sends a second request to a first network device.

The second request includes measurement indication information, and the measurement indication information is used to indicate a cell satisfying a report threshold. The measurement indication information is used to determine a new secondary cell establishing a connection to the terminal device.

Optionally, the second request may further include indication information used to indicate whether the terminal device stores multi-connection context information of the terminal device. If the second request indicates that the terminal device stores the multi-connection context information, the first network device may determine, based on the indication information, that the terminal device stores the multi-connection context information of the terminal device, and may further determine that at least one network device stores the multi-connection context information of the terminal device. For a specific description of the indication information, refer to the foregoing description. Details are not described herein again. When the second request indicates that the terminal device does not store the multi-connection context information, the first network device may determine that a multi-connection mode is not configured for the terminal device, and does not resume the multi-connection mode of the terminal device.

Correspondingly, the method may further include the following step:

S302. The first network device receives the second request from the terminal device.

The second request may be a connection resume request, for example, a radio resource control resume request (RRC resume request) or a radio resource control connection resume request (RRC Connection resume request).

The measurement indication information may be obtained by the terminal device by measuring cells corresponding to the measurement configuration information, based on measurement configuration information sent by the second network device, measurement configuration information sent by the first network device, or preset measurement configuration information.

The terminal device determines the measurement indication information based on measurement results of cells corresponding to the measurement configuration information.

The measurement configuration information may include a report threshold. When a measurement result of one cell corresponding to the measurement configuration information among the measurement results of the cells corresponding to the measurement configuration information is greater than or equal to the report threshold, the terminal device may determine that the cell satisfies the report threshold.

Optionally, the measurement configuration information may further include information about at least one cell. The at least one cell corresponds to the measurement configuration information. Information of a cell may include identity information and/or frequency information of the cell. The identity information of the cell includes at least one of the following information: a cell global identifier (CGI), a physical cell identifier (PCI), or a cell identifier of the cell.

If the measurement configuration information is sent by the first network device, the first network device may send system information, such as RRC signaling and/or a MAC message, carrying the measurement configuration information to the terminal device, to transmit the measurement configuration information. If the measurement configuration information is sent by the first network device, the report threshold is known to the first network device.

If the measurement configuration information is sent by the second network device, the second network device may send the measurement configuration information to the terminal device when releasing the terminal device to enter an inactive state. It may be understood that the measurement configuration information is sent by the second network device. Therefore, the report threshold is unknown to the first network device. The report threshold may be sent to the first network device in measurement indication information sent by the terminal device. Alternatively, the second network device may send the report threshold to the first network device. It may be understood that the first network device may further determine, based on the report threshold, whether the terminal device needs to be resumed to the multi-connection mode.

After obtaining the measurement results of the cells corresponding to the measurement configuration information, the terminal device determines, based on the report threshold, whether a measurement result of each cell satisfies the report threshold, determines, from the cells, a cell satisfying the report threshold, and then determines the measurement indication information based on the cell satisfying the report threshold.

In an implementation, the measurement indication information may include identity information and/or frequency information of the cell satisfying the report threshold.

In this implementation, the terminal device may send, to the first network device, the identity information and/or the frequency information of the cell satisfying the report threshold, so that after receiving the measurement indication information, the first network device can accurately and timely learn of the cell satisfying the report threshold. The first network device may determine, based on the identity information and/or the frequency information of the cell satisfying the report threshold, a network device serving the cell satisfying the report threshold. Further, the first network device may determine a fourth network device from at least one network device corresponding to a cell satisfying the report threshold.

In another implementation, the measurement indication information may include an index of the cell satisfying the report threshold.

In this implementation, the index of the cell reported by the terminal device is in a one-to-one correspondence with information about the cell in the measurement configuration information received by the terminal device. Therefore, information about the cell satisfying the report threshold, for example, the identity information and/or the frequency information of the cell, may be determined based on the index of the cell and the information about the cell in the measurement configuration information.

If the measurement configuration information is sent by the second network device to the terminal device, after the first network device obtains, from the terminal device, the index of the cell satisfying the report threshold, the method may further include: sending, by the first network device to the second network device, the index of the cell satisfying the report threshold; and receiving, by the second network device from the first network device, the index of the cell satisfying the report threshold.

The second network device may determine, based on the index of the cell and the information about the cell in the measurement configuration information, the information about the cell satisfying the report threshold, for example, the identity information and/or the frequency information of the cell. The second network device sends, to the first network device, the information about the cell satisfying the report threshold, for example, the identity information and/or the frequency information of the cell, so that the first network device can accurately identify the cell satisfying the report threshold. Optionally, the first network device may determine the network device serving the cell satisfying the report threshold. Further, the first network device may determine a fourth network device from at least one network device corresponding to a cell satisfying the report threshold.

For example, the information about the cell in the measurement configuration information sent by the second network device is a cell list. Information about each cell in the cell list includes identity information and/or frequency information of the cell. Optionally, in the cell list, each cell has a corresponding cell index, and the index may be used to indicate a corresponding cell. Alternatively, the index of the cell is determined based on a sequence of the cell in the cell list. In this case, when reporting the measurement indication information, the terminal device may report the index of the cell satisfying the report threshold, and does not need to report the information about the cell satisfying the report threshold. Therefore, when the index of the cell reported by the terminal device is sent by the first network device to the second network device, the second network device may determine, based on the index of the cell and the cell list in the measurement configuration information, the information about the cell satisfying the report threshold. Because only the index of the cell needs to be transmitted, information indication bits can be effectively reduced. Optionally, the second network device may further send, to the first network device, the information about the cell in the measurement configuration information, for example, the cell list. If the second network device sends the information about the cell in the measurement configuration information to the first network device, after receiving the index of the cell reported by the terminal device, the first network device may directly determine, based on the index of the cell and the cell list in the measurement configuration information, the information about the cell satisfying the report threshold.

In still another implementation, the measurement indication information may include indication information indicating whether the at least one cell satisfies the report threshold. For example, the indication information may be in a form of a bitmap, and a bitmap is used to indicate whether a corresponding cell satisfies the report threshold.

In this implementation, in the measurement indication information, the indication information may be in one-to-one correspondence with the information about the cell in the measurement configuration information, and is used to indicate whether each cell in the measurement configuration information satisfies the report threshold.

For example, if the information about the cell corresponding to the measurement configuration information is a master cell group {cell 1, cell 2} and a secondary cell group {cell 3, cell 4}, the measurement indication information may include, for example, that four bits each correspond to one cell. For example, the first bit may correspond to the cell 1 in the master cell group, the second bit may correspond to the cell 2 in the master cell group, the third bit may correspond to the cell 3 in the secondary cell group, and the fourth bit may correspond to the cell 4 in the secondary cell group. For example, values of the four bits of the measurement indication information may be {0011}, where 0 may be used to indicate that a measurement result of a cell corresponding to the bit does not satisfy the report threshold, and 1 is used to indicate that a measurement result of a cell corresponding to the bit satisfies the report threshold. It may be understood that, alternatively, 1 may be used to indicate that a measurement result of a cell corresponding to the bit does not satisfy the report threshold, and 0 is used to indicate that a measurement result of a cell corresponding to the bit satisfies the report threshold. In this implementation, the identity information and/or the frequency information of the cell satisfying the report threshold may be determined based on the bit corresponding to the cell and the information about the cell in the measurement configuration information. For a specific manner, refer to the description of the index of the cell in the embodiments of this application. Details are not described herein again.

If the measurement configuration information is sent by the second network device to the terminal device, after the first network device obtains, from the terminal device, the indication information indicating whether the at least one cell satisfies the report threshold, the method may further include: sending, by the first network device to the second network device, the indication information indicating whether the at least one cell satisfies the report threshold; and receiving, by the second network device from the first network device, the indication information indicating whether the at least one cell satisfies the report threshold.

The second network device may determine, based on the indication information indicating whether the at least one cell satisfies the report threshold and the information about the cell in the measurement configuration information, the identity information and/or the frequency information of the cell satisfying the report threshold. The second network device sends, to the first network device, the information about the cell satisfying the report threshold, for example, the identity information and/or the frequency information of the cell, so that the first network device can accurately identify the cell satisfying the report threshold. Optionally, the first network device may determine the network device serving the cell satisfying the report threshold. Further, the first network device may determine a fourth network device from at least one network device corresponding to a cell satisfying the report threshold.

Optionally, based on the method shown in any one of the foregoing embodiments, the measurement indication information may further include information used to indicate the measurement result corresponding to the cell satisfying the report threshold.

The measurement result includes at least one of reference signal received power (RSRP), reference signal received quality (RSRQ), a signal-to-noise ratio (SNR), a signal to interference plus noise ratio (SINR), a reference signal strength indication (RSSI), or other signal quality. Downlink signal quality may be at least one of a cell level, a beam level, an air interface technology (numerology) level, a slicing level, or a bandwidth part (BWP) level. The measurement result may be obtained by measuring at least one of a downlink synchronization channel, a channel-state information reference signal (CSI-RS), a demodulation reference signal (DMRS), a cell-specific reference signal (CRS), a synchronization signal (SS), a synchronization signal/physical broadcast channel block (SS/PBCH Block), or another downlink signal.

To enable the first network device to clearly learn of quality that is of the cell satisfying the report threshold and that is indicated by the measurement indication information reported by the terminal device, and further select a new secondary network device, the terminal device may further send, to the first network device, the measurement indication information carrying the information used to indicate the measurement result.

Optionally, based on the method shown in any one of the foregoing embodiments, the measurement indication information may further include the report threshold. Correspondingly, the report threshold may include at least one of an RSRP threshold, an RSRQ threshold, an SNR threshold, an SINR threshold, an RSSI threshold, or another quality threshold.

To enable the first network device to have a specific understanding of the quality that is of the cell satisfying the report threshold and that is indicated by the measurement indication information reported by the terminal device, after determining the report threshold, the first network device may further determine, based on the report threshold and the cell satisfying the report threshold, whether to configure the multi-connection mode for the terminal device. In this way, the secondary network device configured by the first network device for the terminal device can better satisfy a requirement of the terminal device, thereby ensuring transmission quality.

In an implementation, the terminal device may send the measurement indication information carrying the report threshold to the first network device. For example, when the terminal device reselects another cell, the terminal device may determine that a cell on which the terminal device currently camps is different from a cell in which the terminal device is configured to enter the inactive state, and the terminal device may send the report threshold to the first network device. It may be understood that the terminal device may further send the report threshold to the first network device by using other information. It is not limited in the embodiments of this application that the report threshold is sent by using the measurement indication information.

In another implementation, the second network device may further send the report threshold to the first network device. For example, when the report threshold is included in measurement configuration information that is configured by the second network device and that is received by the terminal device, the second network device sends the report threshold to the first network device. In this case, it may be predefined in a protocol that the terminal device does not send the report threshold to the first network device. In addition, the second network device may further send the report threshold based on a request of the first network device. For example, when the first network device requests the report threshold from the second network device, the second network device may send the report threshold to the first network device. The first network device may request the report threshold from the second network device by using a separate message, or may request the report threshold from the second network device while sending, to the second network device, the index of the cell satisfying the report threshold.

Therefore, if the measurement configuration information is configured by the second network device, the method may further include: optionally sending, by the first network device to the second network device, information for requesting the report threshold; sending, by the second network device to the first network device, information used to indicate the report threshold; and receiving, by the first network device from the second network device, the information used to indicate the report threshold.

The information used to indicate the report threshold may be a value of the report threshold, an index value of the report threshold, or the like. The second network device may include, to another message sent to the first network device, the information used to indicate the report threshold.

Optionally, when the first network device obtains the measurement indication information by performing S302, the method may further include the following step.

S303. The first network device sends a response, where the response is used to indicate whether the multi-connection mode of the terminal device is resumed.

Correspondingly, the terminal device receives the response from the first network device.

Optionally, the response may be a resume response. The first network device may determine, based on the measurement indication information, a fourth network device from at least one network device corresponding to a cell satisfying the report threshold, as a new secondary network device of the terminal device; and send the response to indicate to resume the multi-connection mode of the terminal device. Alternatively, the first network device may further determine, based on the measurement indication information and the information about the cell sent by the second network device, or the measurement indication information and the report threshold, a fourth network device from at least one network device corresponding to a cell satisfying the report threshold, as a new secondary network device of the terminal device; and send the response to indicate to resume the multi-connection mode of the terminal device. Certainly, the first network device may alternatively select, according to another selection rule, the fourth network device from the at least one network device corresponding to the cell satisfying the report threshold. For a specific description of determining the fourth network device by the first network device based on the measurement indication information, refer to the foregoing description. Details are not described herein again.

The cells satisfying the report threshold may include at least one cell or at least one cell served by at least one network device. In this case, the first network device may determine a network device corresponding to the cell satisfying the report threshold as the fourth network device.

Optionally, based on any one of the foregoing methods, the first network device is a new secondary network device configured for the terminal device, namely, the fourth network device; may be the second network device or the third network device; or may be different from the second network device and the third network device.

In a manner, if the fourth network device is the third network device, the method may further include: sending, by the first network device, a third request to the fourth network device, where the third request includes an identifier of the terminal device, the third request is used to request the fourth network device to resume the connection to the terminal device based on the context information of the terminal device on the third network device, namely, the fourth network device; receiving, by the fourth network device, the third request, and resuming the connection to the terminal device based on the context information of the terminal device on the third network device, where the third request may be a retrieve terminal context request, and the identifier of the terminal device may include at least one of the following: a UE resume identifier, an international mobile subscriber identity (IMSI) of the terminal device, or a system architecture evolution-temporary mobile subscriber identity (S-TMSI) of the terminal device.

In this implementation, the fourth network device is the third network device. Therefore, the first network device does not need to include the context information of the terminal device on the third network device to the third request. When receiving the third request sent by the first network device, the fourth network device may activate the context information of the terminal device on the third network device. When receiving the third request, the fourth network device may further return a response to the first network device, for example, a retrieve terminal context response, to notify the first network device that the fourth network device has activated the context information of the terminal device.

In another manner, if the first network device is the new secondary network device configured for the terminal device, namely, the fourth network device, and is different from the third network device, the fourth network device may be the second network device, or may be different from the second network device and the third network device. The method may further include: sending, by the first network device, a fourth request to the fourth network device, where the fourth request includes the identifier of the terminal device and the context information of the terminal device on the third network device, and the fourth request is used to request the fourth network device to establish a connection to the terminal device based on the context information of the terminal device on the third network device; and receiving, by the fourth network device, the fourth request, and establishing the connection to the terminal device based on the context information of the terminal device on the third network device, where the fourth request may be a terminal context establishment request, the identifier of the terminal device may be similar to the identifier included in the third request, and details are not described herein again.

In this implementation, if the fourth network device is different from the second network device and the third network device, the fourth network device does not have the context information of the terminal device on the third network device. Therefore, the first network device needs to include the context information of the terminal device on the third network device to the fourth request, and sends the fourth request to the fourth network device. When receiving the fourth request sent by the first network device, the fourth network device may activate the context information of the terminal device on the third network device. When receiving the fourth request, the fourth network device may further return a response to the first network device, for example, a response to a request to establish terminal context, to notify the first network device that the fourth network device has activated the context information of the terminal device on the third network device.

Based on any one of the foregoing methods, the method may further include the following content.

The response in S303 may include information about a new secondary cell. The information about the new secondary cell is used to add, activate, or modify the new secondary cell of the terminal device.

After receiving the response, the terminal device may add, modify, or activate the new secondary cell according to the information about the new secondary cell included in the response.

The response may be, for example, a resume response, for example, any one of an RRC resume message, an RRC setup message, and a connection setup (RRC connection setup) message. After receiving the information about the new secondary cell sent by the first network device, the terminal device may determine the new secondary cell as a new secondary cell of the terminal device, and use the fourth network device to which the new secondary cell belongs as a secondary network device to establish a connection to the fourth network device. In this way, the multi-connection mode, for example, a DC mode, of the terminal device is resumed.

In an implementation, the information about the new secondary cell may include the identity information and/or the frequency information of the cell. The new secondary cell is served by the fourth network device.

In still another implementation, the information about the new secondary cell of the terminal device may alternatively be an index of the cell or other indication information. For example, the information about the new secondary cell is other indication information in a bitmap form. If the measurement indication information reported by the terminal device is {0011} or {cell 1, cell 2, cell 3, cell 4}, the first network device may indicate the information about the corresponding new secondary cell by using a bitmap, for example, {0011}, {0001}, or {0010}. A cell that is in measurement indication information reported by the terminal device and that corresponds to a bit in which a bit value 1 is located is a secondary cell of the terminal device. For a specific manner in which the terminal device determines the information about the cell based on the index of the cell or other indication information, refer to descriptions of the index of the cell or the other indication information in the embodiments of this application. Details are not described herein again.

It may be understood that, in an implementation, if the first network device does not send the information about the new secondary cell, the terminal device does not resume the multi-connection mode by default, but considers that only the context information on the second network device is to be activated. Optionally, the terminal device may delete the stored context information on the third network device.

Based on the foregoing implementations, the response in S303 may further include an activation indication, which is used to indicate whether the terminal device activates the context information of the terminal device on the third network device, or is used to indicate whether the multi-connection mode is resumed for the terminal device, or is used to indicate whether the terminal device activates only the context information on the second network device.

It may be understood that the terminal device and/or the network device may perform some or all of the steps in the foregoing embodiment. These steps or operations are merely examples. In the embodiments of the present invention, other operations or variations of various operations may further be performed. In addition, the steps may be performed in a sequence different from that presented in the foregoing embodiment, and possibly, not all operations in the foregoing embodiment need to be performed.

According to the communication method provided in this embodiment of this application, only required context information of the terminal device is indicated by using the request indication information, thereby effectively reducing unnecessary signaling overheads. The terminal device or the second network device may further transmit the report threshold to the first network device, so that the first network device may further determine whether to configure the multi-connection mode for the terminal device. In this way, quality of the secondary network device configured for the terminal device is better, a transmission requirement of the terminal device is better satisfied, and transmission efficiency is ensured.

Figure 4A:
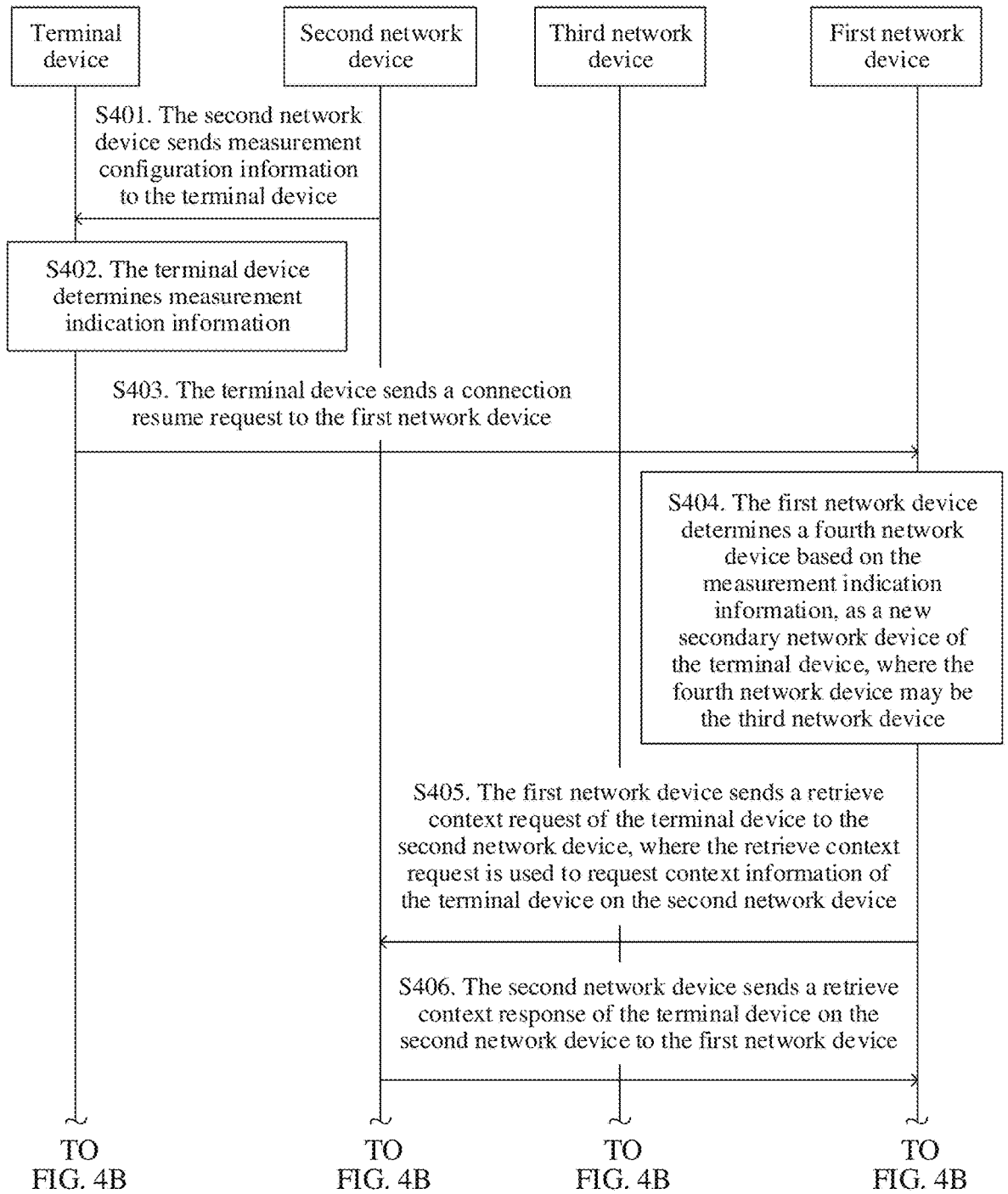
FIG. 4A and FIG. 4B are a third signaling interaction diagram of a communication method according to an embodiment of this application.
Figure 4B:
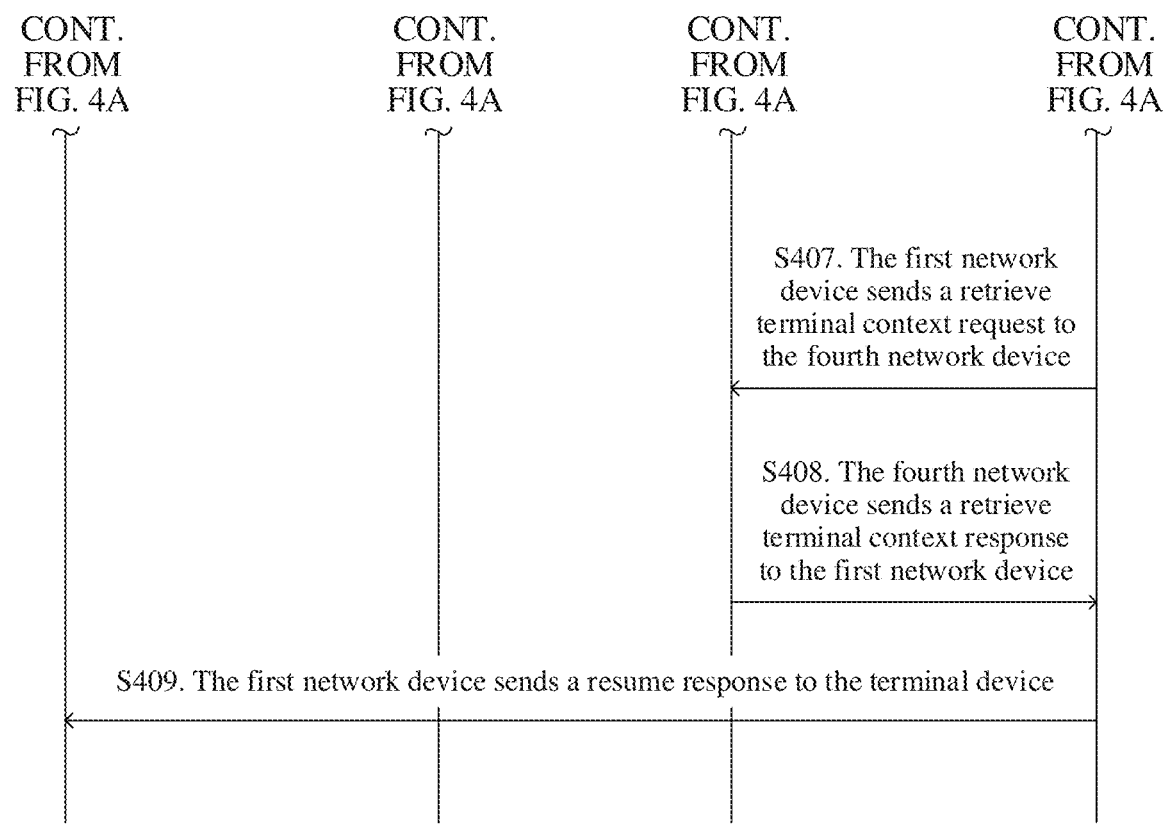

An embodiment of this application may further provide a communication method. FIG. 4A and FIG. 4B are a third signaling interaction diagram of a communication method according to an embodiment of this application. The communication method shown in FIG. 4A and FIG. 4B may be a possible example of the communication method shown in FIG. 2 and/or FIG. 3. The communication method shown in FIG. 4A and FIG. 4B and the communication method shown in FIG. 2 and/or FIG. 3 may be cross-referenced. As shown in FIG. 4A and FIG. 4B, the method in this embodiment may include the following steps.

S401. A second network device sends measurement configuration information to a terminal device.

The measurement configuration information may include a report threshold and information about at least one cell.

The second network device may be an original master network device of the terminal device in a connected state.

When releasing the terminal device to enter an inactive state, the second network device may send the measurement configuration information to the terminal device by using RRC signaling.

S402. The terminal device determines measurement indication information.

The terminal device may measure, based on the measurement configuration information, a cell corresponding to the measurement configuration information to obtain a measurement result, and determine the measurement indication information based on the measurement result.

The cell corresponding to the measurement configuration information is the at least one cell.

S403. The terminal device sends a connection resume request to a first network device.

The connection resume request may include the measurement indication information, and the measurement indication information is used to indicate a cell satisfying the report threshold. For a specific description of the measurement indication information, refer to the foregoing description. Details are not described herein again.

Optionally, the connection resume request may further include indication information used to indicate whether the second network device and a third network device store context information of the terminal device. For a specific description of the indication information, refer to the foregoing description. Details are not described herein again.

The first network device may be a network device serving a cell on which the terminal device currently camps, namely, a new master network device of the terminal device. In this embodiment, the first network device is different from the second network device and the third network device.

S404. The first network device determines a fourth network device as a new secondary network device of the terminal device based on the measurement indication information.

The fourth network device may be the third network device, and the third network device may be an original secondary network device of the terminal device in the connected state.

For example, the measurement indication information includes identity information and/or frequency information of a cell satisfying the report threshold. The first network device may determine the new secondary cell based on the identity information and/or the frequency information of the cell, to further determine the fourth network device based on information about the new secondary cell. The fourth network device is the new secondary network device of the terminal device.

S405. The first network device sends a retrieve context request of the terminal device to the second network device, where the retrieve context request is used to request the context information of the terminal device on the second network device.

S406. The second network device sends a retrieve response of the context information of the terminal device on the second network device to the first network device.

The retrieve response may include the context information of the terminal device on the second network device.

S407. The first network device sends a retrieve terminal context request to the fourth network device.

The fourth network device is the third network device, and the first network device sends the retrieve terminal context request to the fourth network device, and the retrieve terminal context request includes an identifier of the terminal device.

S408. The fourth network device sends a retrieve terminal context response to the first network device.

The retrieve terminal context response is used to instruct the fourth network device to activate context information of the terminal device on the fourth network device.

S409. The first network device sends a retrieve response to the terminal device.

The retrieve response includes the information about the new secondary cell. The new secondary cell is served by the fourth network device. The information about the new secondary cell is used to add, activate, or modify the new secondary cell of the terminal device. For a specific description of the information about the new secondary cell, refer to the foregoing description. Details are not described herein again.

It may be understood that the terminal device and/or the network device may perform some or all of the steps in the foregoing embodiment. These steps or operations are merely examples. In the embodiments of the present invention, other operations or variations of various operations may further be performed. In addition, the steps may be performed in a sequence different from that presented in the foregoing embodiment, and possibly, not all operations in the foregoing embodiment need to be performed. For example, the first network device may first determine the fourth network device as the new secondary network device, and then request context information of the terminal device from the second network device; or may first request context information of the terminal device from the second network device, and then determine the fourth network device as the new secondary network device. For example, after receiving the measurement indication information, the first network device possibly cannot directly determine cell information, and the second network device needs to assist in determining the cell information. Therefore, the first network device may include, to a same message, the context information of the terminal device and the cell information that is determined with the assistance of the second network device. In this case, the first network device cannot determine the new secondary network device before obtaining the context information of the terminal device.

According to the foregoing communication method provided in this embodiment of this application, an example in which the new secondary network device is the original secondary network device may be provided to resume a multi-connection mode of the terminal device. For specific implementation and beneficial effects of the communication method, refer to the foregoing description. Details are not described herein again.

Figure 5A:
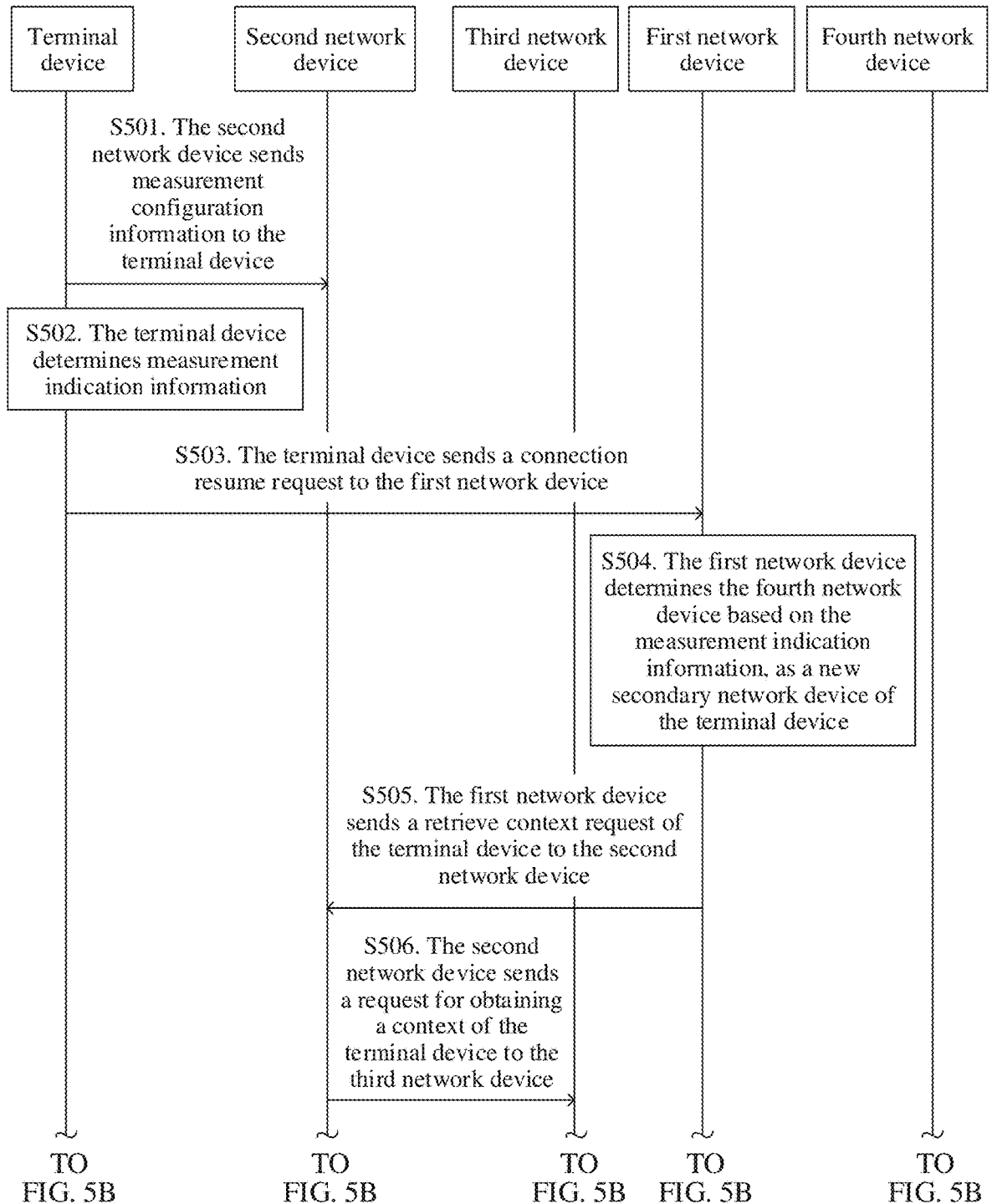
FIG. 5A and FIG. 5B are a fourth signaling interaction diagram of a communication method according to an embodiment of this application.
Figure 5B:
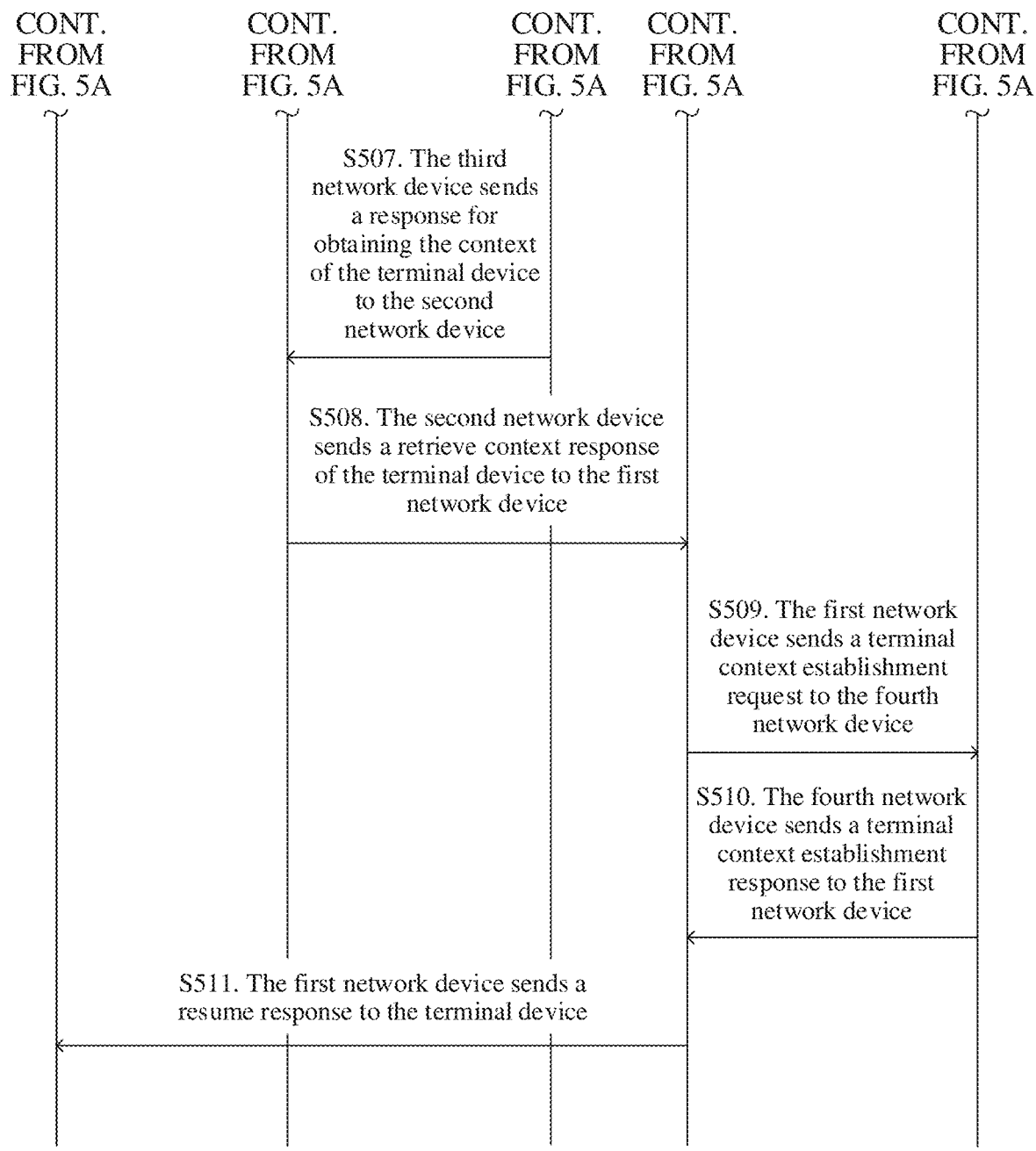

An embodiment of this application may further provide a communication method. FIG. 5A and FIG. 5B are a fourth signaling interaction diagram of a communication method according to an embodiment of this application. The communication method shown in FIG. 5A and FIG. 5B may be another possible example of the communication method shown in FIG. 2 and/or FIG. 3. The communication method shown in FIG. 5A and FIG. 5B and the communication method shown in FIG. 2 and/or FIG. 3 may be cross-referenced. As shown in FIG. 5A and FIG. 5B, the method in this embodiment may include the following steps.

S501. A second network device sends measurement configuration information to a terminal device.

S502. The terminal device determines measurement indication information.

S503. The terminal device sends a connection resume request to a first network device.

S504. The first network device determines a fourth network device as a new secondary network device of the terminal device based on the measurement indication information.

In this embodiment, the fourth network device is different from the second network device and a third network device.

For steps S501 to S504, refer to steps S401 to S404 in the embodiments of this application.

S505. The first network device sends a retrieve context request of the terminal device to the second network device.

If the fourth network device is different from the second network device and the third network device, the first network device sends the retrieve context request of the terminal device to the second network device. The retrieve context request is used to request context information of the terminal device on the second network device and the third network device, or the retrieve context request is used to request context information of the terminal device on the third network device, or the retrieve context request is used to request all context information of the terminal device.

The third network device is an original secondary network device of the terminal device in a connected state.

Optionally, if the second network device does not have the context information of the terminal device on the third network device, this embodiment of this application further includes the following steps.

S506. The second network device sends, to the third network device, a request for obtaining a context of the terminal device.

The request for obtaining the context of the terminal device includes an identifier of the terminal device.

S507. The third network device sends, to the second network device, a response for obtaining the context of the terminal device.

The response for obtaining the context of the terminal device includes the context information of the terminal device on the third network device, and steps S506 and S507 are optional.

S508. The second network device sends a retrieve context response of the terminal device to the first network device.

The retrieve context response includes the context information of the terminal device on the second network device and the third network device. Optionally, the retrieve context response may further include a report threshold.

S509. The first network device sends a terminal context establishment request to the fourth network device.

The terminal context establishment request includes the identifier of the terminal device and the context information of the terminal device on the third network device.

The context information of the terminal device on the third network device is used to establish a connection between the fourth network device and the terminal device.

S510. The fourth network device sends a terminal context establishment response to the first network device.

The terminal context establishment response is used to instruct the fourth network device to establish a connection to the terminal device.

S511. The first network device sends a retrieve response to the terminal device.

The retrieve response includes information about a new secondary cell. The new secondary cell is served by the fourth network device. The information about the new secondary cell is used to add, activate, or modify the new secondary cell of the terminal device. For a specific description of the information about the new secondary cell, refer to the foregoing description. Details are not described herein again.

It may be understood that the terminal device and/or the network device may perform some or all of the steps in the foregoing embodiment. These steps or operations are merely examples. In the embodiments of the present invention, other operations or variations of various operations may further be performed. In addition, the steps may be performed in a sequence different from that presented in the foregoing embodiment, and possibly, not all operations in the foregoing embodiment need to be performed.

According to the foregoing communication method provided in this embodiment of this application, an example in which a new secondary network device is different from an original master network device and an original secondary network device may be provided to resume a multi-connection mode of the terminal device. For specific implementation and beneficial effects of the communication method, refer to the foregoing description. Details are not described herein again.

Figure 6:
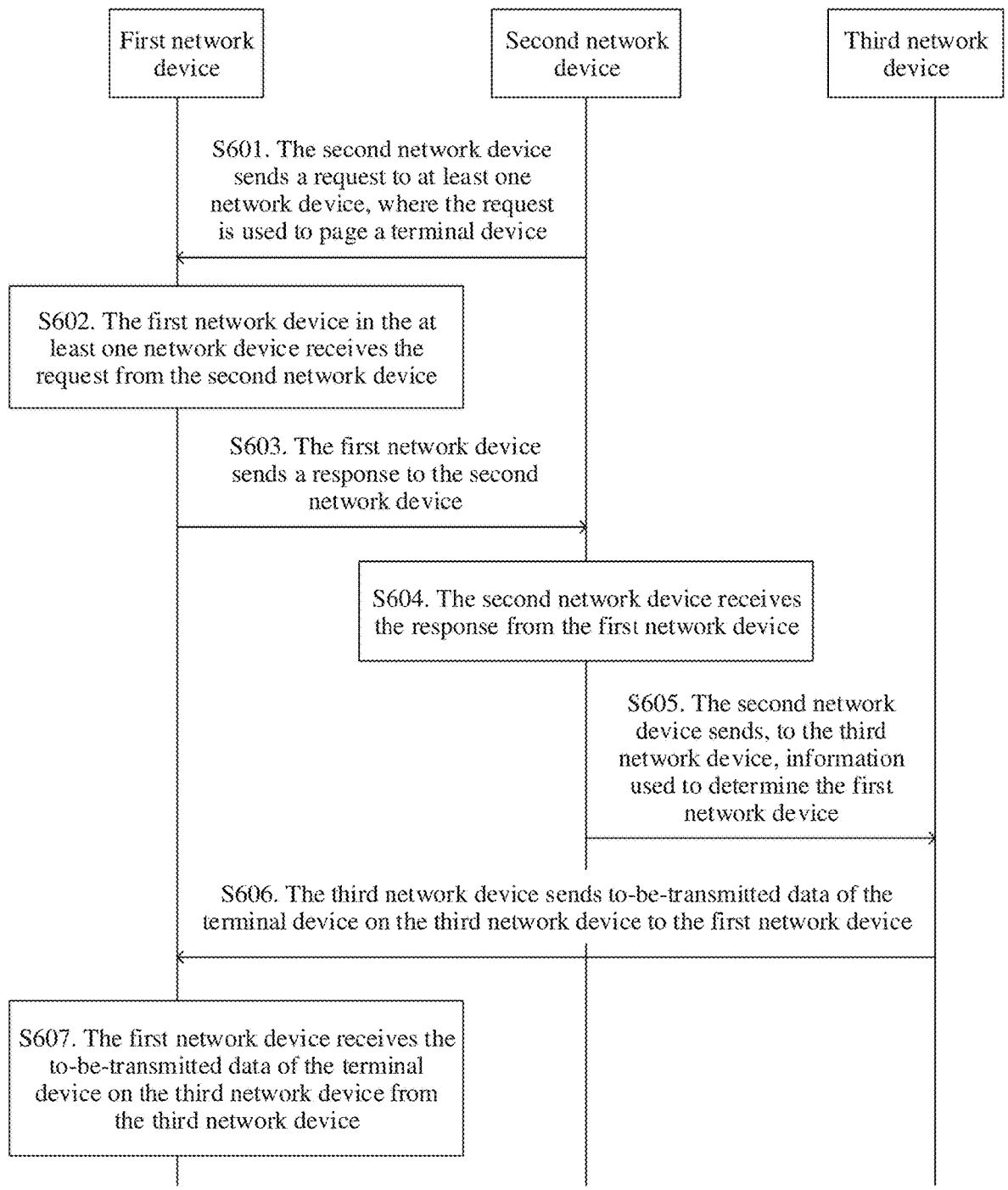
FIG. 6 is a fifth signaling interaction diagram of a communication method according to an embodiment of this application.

An embodiment of this application may further provide a communication method. FIG. 6 is a fifth signaling interaction diagram of a communication method according to an embodiment of this application. As shown in FIG. 6, the communication method provided in this embodiment of this application may include the following steps.

S601. A second network device sends a request to at least one network device, where the request is used to page a terminal device.

The second network device is an original master network device of the terminal device in a connected state.

In the communication method provided in this embodiment, the request is a paging request, for example, a radio access network paging request (RAN Paging request).

When determining that a third network device has data to be transmitted to the terminal device, the second network device may send the request to the at least one network device, to request the at least one network device to page the terminal device.

When there is to-be-transmitted data of the terminal device on the third network device, the third network device knows that the terminal device is in an inactive state, and cannot directly send the to-be-transmitted data to the terminal device. Therefore, to send the to-be-transmitted data, the third network device needs to send a request to the second network device, to trigger the second network device to send a request to the at least one network device to page the terminal device.

S602. A first network device in the at least one network device receives the request from the second network device.

S603. The first network device sends a response to the second network device.

The response is used to indicate that the first network device has successfully paged the terminal device, and the response includes information used to determine the first network device, for example, identity information of the first network device and/or information about a cell served by the first network device.

The third network device is an original secondary network device of the terminal device in the connected state.

If the first network device receives the request, and has successfully paged the terminal device, in other words, receives a paging response of the terminal device, the first network device may send the response to the second network device. For example, the paging response may be an RRC resume request. The response sent to the second network device may be, for example, a request for obtaining a context of the terminal device, or may be another response used to notify the second network device that the terminal device is served by the first network device.

S604. The second network device receives the response from the first network device.

S605. The second network device sends, to the third network device, the information used to determine the first network device.

The information used to determine the first network device may be, for example, the identity information of the first network device and/or the information about the cell served by the first network device.

After receiving the response, the second network device may determine that the terminal device is successfully paged, and the terminal device is located in the cell served by the first network device. Therefore, the second network device may send, to the third network device, information used to indicate the identity information of the first network device, so that the third network device knows that the terminal device is located in the cell served by the first network device.

S606. The third network device sends the to-be-transmitted data of the terminal device on the third network device to the first network device.

When determining that the terminal device is located in the cell served by the first network device, the third network device may directly send the to-be-transmitted data to the first network device, or may first transmit the to-be-transmitted data to the second network device, and the second network device transmits the to-be-transmitted data to the first network device.

S607. The first network device receives, from the third network device, the to-be-transmitted data of the terminal device on the third network device.

After receiving the to-be-transmitted data, the first network device may further send the to-be-transmitted data to the terminal device. Optionally, after receiving the to-be-transmitted data, the first network device may first establish a connection to the terminal device, and then transmit the to-be-transmitted data to the terminal device.

According to the communication method provided in this embodiment of this application, the first network device may receive a first request from the second network device, send the response to the second network device, and then receive the to-be-transmitted data of the terminal device on the third network device from the third network device. The first request is used to page the terminal device, the second network device is the original master network device of the terminal device in the connected state, the response is used to trigger the second network device to send, to the third network device, the information used to indicate the first network device, and the third network device is the original secondary network device of the terminal device in the connected state. In the method, the third network device may page the terminal device via a network device serving a cell that the terminal device currently camps on, namely, the first network device, and then transmit the to-be-transmitted data to the first network device. In this way, when the to-be-transmitted data of the terminal device in the inactive state needs to be transmitted on the original secondary network device, transmission of the to-be-transmitted data is implemented.

Optionally, based on the communication method shown in FIG. 6, in S603, after the second network device sends, to the third network device, the information used to determine the first network device, the method may further include: determining, by the third network device based on the information used to determine the first network device, whether there is an inter-network device interface connection, for example, an Xn interface connection, between the third network device and the first network device.

There may be an inter-network device interface connection, for example, an Xn interface connection, between the third network device and the first network device; or there may be no inter-network device interface connection between the third network device and the first network device.

If there is an inter-network device interface connection between the third network device and the first network device, the third network device may send the to-be-transmitted data to the first network device through a data transmission channel between the third network device and the first network device.

If there is no inter-network device interface connection between the third network device and the first network device, after establishing an inter-network device interface connection to the first network device, the third network device may send the to-be-transmitted data to the first network device through the data transmission channel between the third network device and the first network device. If the third network device cannot establish an inter-network device interface connection to the first network device, the third network device cannot directly send the to-be-transmitted data to the first network device. Therefore, the to-be-transmitted data may be transmitted to the first network device via another device.

In an example, if there is no inter-network device interface connection between the first network device and the third network device, step S607 that the first network device receives, from the third network device, the to-be-transmitted data of the terminal device on the third network device may include: sending, by the third network device, the to-be-transmitted data to the second network device; receiving, by the second network device, the to-be-transmitted data from the third network device; sending, by the second network device, the to-be-transmitted data to the first network device; and receiving, by the first network device, the to-be-transmitted data from the second network device.

In other words, if there is no inter-network device connection interface between the first network device and the third network device, and the inter-network device interface connection cannot be established, the third network device may first send the to-be-transmitted data to the second network device, and the second network device sends the to-be-transmitted data to the first network device, implementing transmission of the to-be-transmitted data between the third network device and the first network device.

In an example, if there is no inter-network device interface connection between the first network device and the third network device, the communication method may further include: sending, by the first network device, a request to the second network device, to request context information of the terminal device on the second network device and the third network device; and receiving, by the first network device, the context information of the terminal device in the second network device from the second network device and rejection indication information from the second network device, where the rejection indication information is used to indicate that the context information of the terminal device on the third network device is not provided.

Optionally, the rejection indication information is further used to indicate that there is no interface between the third network device and the second network device.

The first network device establishes a connection to the terminal device based on the context information of the terminal device on the second network device. After establishing the connection, the first network device may send, to the terminal device, the to-be-transmitted data received from the second network device. The second network device may receive the to-be-transmitted data from the third network device. In other words, when there is no inter-network device connection interface between the third network device and the first network device, the third network device may send the to-be-transmitted data to the second network device. The second network device forwards the to-be-transmitted data to the first network device, and then the first network device transmits the to-be-transmitted data to the terminal device.

Figure 7A:
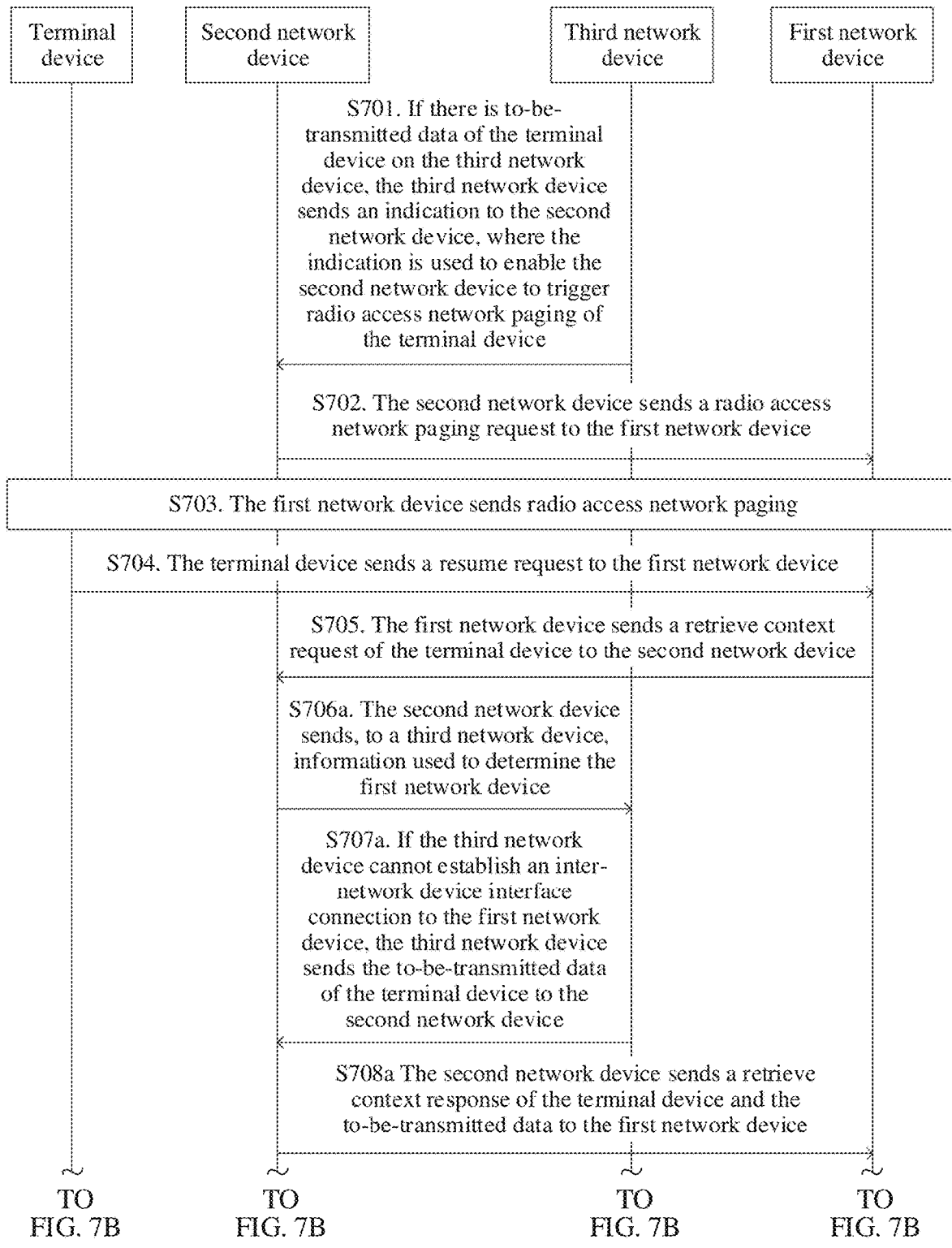
FIG. 7A, FIG. 7B, and FIG. 7C are a sixth signaling interaction diagram of a communication method according to an embodiment of this application.
Figure 7B:
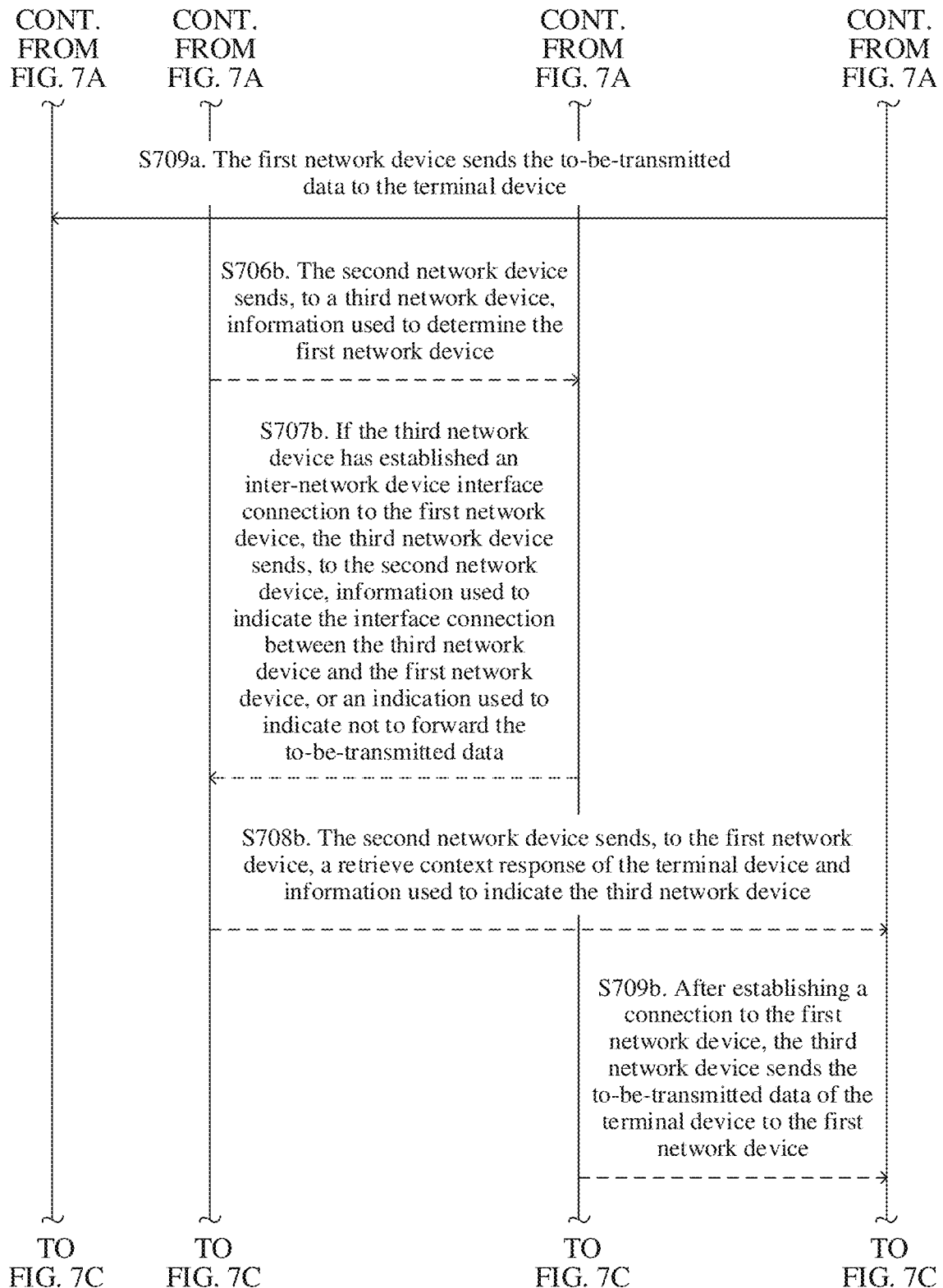
Figure 7C:
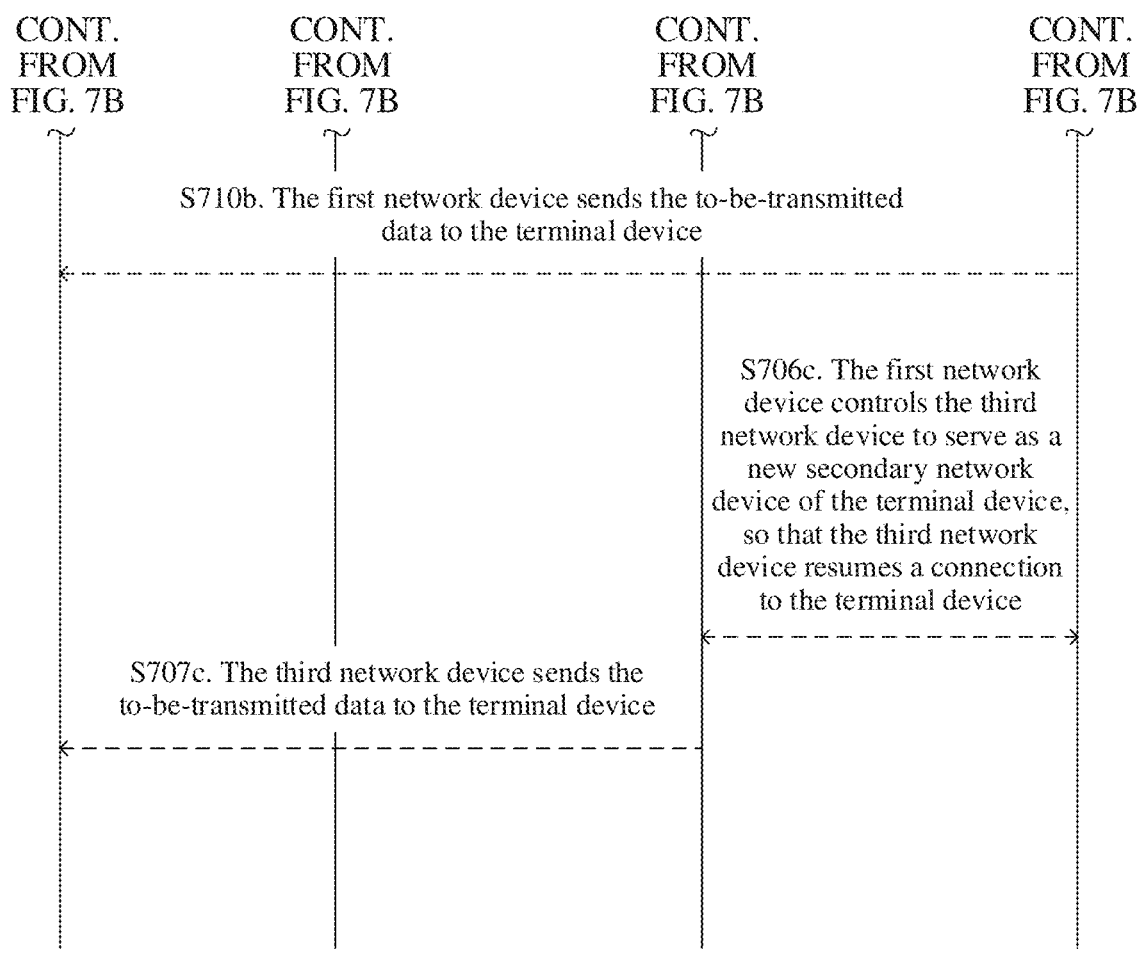

An embodiment of this application may further provide a communication method. FIG. 7A, FIG. 7B, and FIG. 7C are a sixth signaling interaction diagram of a communication method according to an embodiment of this application. The communication method shown in FIG. 7A, FIG. 7B, and FIG. 7C may be a possible example of the communication method shown in FIG. 6. The communication method shown in FIG. 7A, FIG. 7B, and FIG. 7C and the communication method shown in FIG. 6 may be cross-referenced. As shown in FIG. 7A, FIG. 7B, and FIG. 7C, the method in this embodiment may include the following steps.

S701. If there is to-be-transmitted data of a terminal device on a third network device, the third network device sends an indication to a second network device, where the indication is used to enable the second network device to trigger radio access network paging of the terminal device.

S702. The second network device sends a radio access network paging request to a first network device.

S703. The first network device sends radio access network paging.

S704. The terminal device sends a resume request to the first network device.

S705. The first network device sends a retrieve context request of the terminal device to the second network device.

In an implementation, the following S706a to S709a may continue to be performed after S705.

S706a. The second network device sends, to a third network device, information used to determine the first network device.

S707a. If the third network device cannot establish an inter-network device interface connection to the first network device, the third network device sends the to-be-transmitted data of the terminal device to the second network device.

Optionally, the third network device may further send, to the second network device, information used to indicate that there is no inter-base station interface connection between the third network device and the first network device.

S708a. The second network device sends a retrieve context response of the terminal device and the to-be-transmitted data to the first network device.

The retrieve context response includes context information of the terminal device on the second network device.

S709a. The first network device sends the to-be-transmitted data to the terminal device.

In another implementation, the following S706b to S711b may continue to be performed after S705.

S706b. The second network device sends, to a third network device, information used to determine the first network device.

S707b. If the third network device establishes an inter-network device interface connection to the first network device, the third network device sends, to the second network device, information used to indicate an interface connection between the third network device and the first network device or an indication used to indicate not to forward the to-be-transmitted data.

The third network device may send the to-be-transmitted data to the first network device through a data transmission channel between the third network device and the first network device.

S708b. The second network device sends a retrieve context response of the terminal device to the first network device and information used to indicate the third network device.

The retrieve context response includes context information of the terminal device on the second network device.

S709b. After establishing an inter-network device connection to the first network device, the third network device sends the to-be-transmitted data of the terminal device to the first network device.

S710b. The first network device sends the to-be-transmitted data to the terminal device.

In still another implementation, the following S706c to S707c may continue to be performed after S705.

S706c. The first network device controls the third network device to serve as a new secondary network device of the terminal device, so that the third network device resumes a connection to the terminal device.

S707c. The third network device sends the to-be-transmitted data to the terminal device.

According to the foregoing communication method provided in this embodiment of this application, the to-be-transmitted data may be transmitted by using the foregoing three implementations, when there is to-be-transmitted data of the terminal device on the original secondary network device. For specific implementation and beneficial effects of the communication method, refer to the descriptions in the method corresponding to FIG. 6. Details are not described herein again.

It may be understood that the communication methods shown in FIG. 2 to FIG. 7A, FIG. 7B, and FIG. 7C may be separately implemented, or may be used in combination. This is not limited herein.

The foregoing describes in detail the communication methods in the embodiments of this application with reference to FIG. 2 and FIG. 7A, FIG. 7B, and FIG. 7C. The following describes in detail communications apparatuses in the embodiments of this application with reference to FIG. 8 to FIG. 10.

Figure 8:
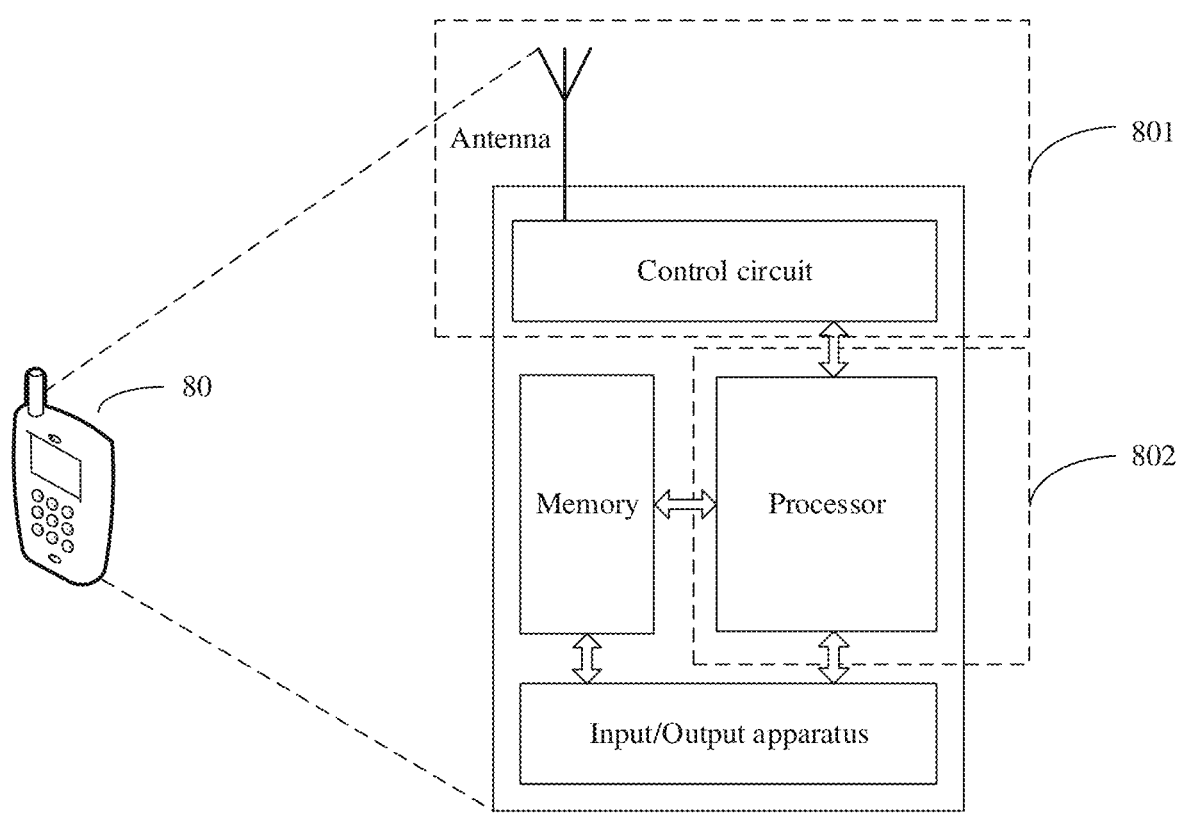
FIG. 8 is a schematic structural diagram of a terminal device according to an embodiment of this application.

FIG. 8 is a schematic structural diagram of a terminal device according to an embodiment of this application. The terminal device is applicable to the system shown in FIG. 1, and performs functions of the terminal device in the foregoing method embodiments. For ease of description, FIG. 8 shows only main components of the terminal device. As shown in FIG. 8, the terminal device 80 includes a processor, a memory, a control circuit, an antenna, and an input/output apparatus. The processor is mainly configured to: process a communications protocol and communications data, control the entire terminal device, execute a software program, and process data of the software program, for example, configured to support the terminal device in performing an action described in the foregoing method embodiments, for example, determining measurement indication information and sending a second request including the measurement indication information. The memory is mainly configured to store a software program and data, for example, store the measurement configuration information described in the foregoing embodiments, information about an original master network device of the terminal device, information about an original secondary network device of the terminal device, information about a new master network device of the terminal device, information about a new secondary network device of the terminal device, context information of the terminal device, and the like. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus such as a touchscreen, a display, or a keyboard is mainly configured to receive data entered by a user and output data to the user.

After the terminal device is powered on, the processor may read the software program in a storage unit, explain and execute an instruction of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data.

A person skilled in the art may understand that for ease of description, FIG. 8 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communications data. The central processing unit is mainly configured to: control the entire terminal device, execute a software program, and process data of the software program. Functions of the baseband processor and the central processing unit may be integrated into the processor in FIG. 8. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of software program. The processor executes the software program to implement a baseband processing function.

In this embodiment of this application, the antenna and the control circuit that have a transceiver function may be considered as a transceiver unit 801 of the terminal device 80, for example, to support the terminal device in performing the receiving function and the sending function that are described in FIG. 2 to FIG. 7A, FIG. 7B, and FIG. 7C. The processor having a processing function is considered as a processing unit 802 of the terminal device 80. As shown in FIG. 8, the terminal device 80 includes the transceiver unit 801 and the processing unit 802. The transceiver unit may also be referred to as a transceiver, a transceiver machine, a transceiver apparatus, or the like. Optionally, a component configured to implement a receiving function in the transceiver unit 801 may be considered as a receiving unit. A component configured to implement a sending function in the transceiver unit 801 may be considered as a sending unit. In other words, the transceiver unit 801 includes the receiving unit and the sending unit. The receiving unit may also be referred to as a receiver, an input port, a receiving circuit, or the like. The sending unit may be referred to as a transmitting machine, a transmitter, a transmitting circuit, or the like.

The processor 802 may be configured to execute an instruction stored in the memory, to control the transceiver unit 801 to receive a signal and/or send a signal, to complete a function of the terminal device in the foregoing method embodiments. In an implementation, a function of the transceiver unit 801 may be implemented by using a transceiver circuit or a transceiver-dedicated chip.

Figure 9:
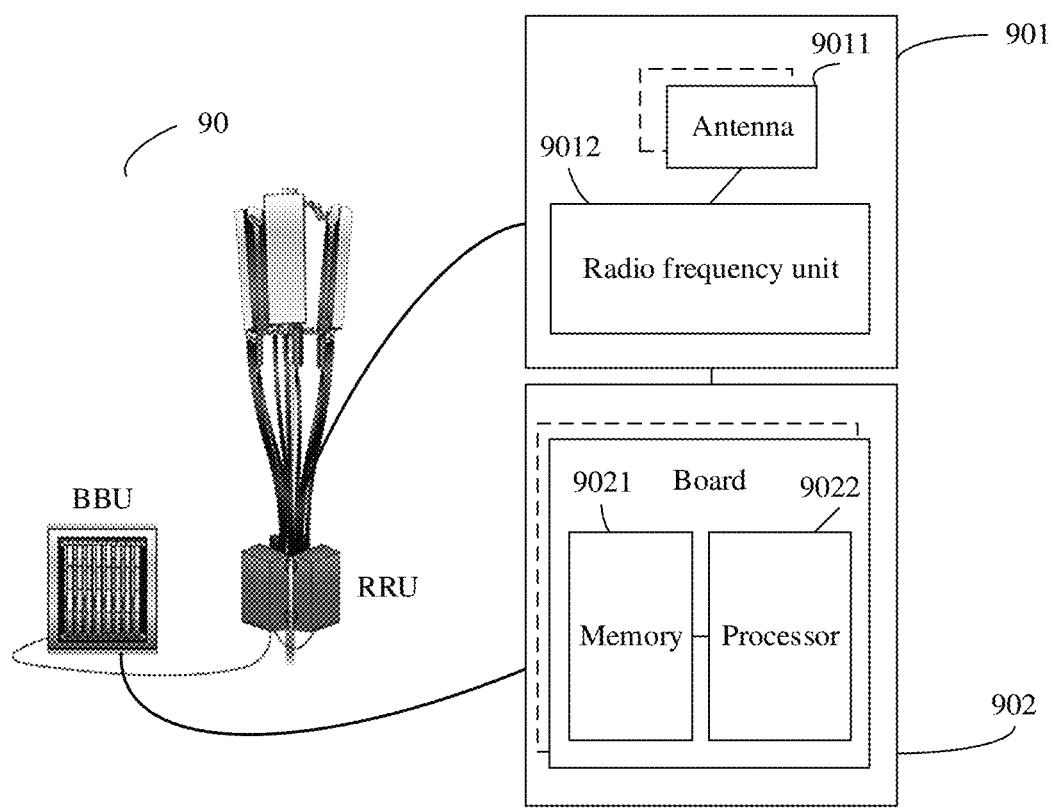
FIG. 9 is a schematic structural diagram of a network device according to an embodiment of this application.

FIG. 9 is a schematic structural diagram of a network device according to an embodiment of this application, for example, may be a schematic structural diagram of a base station. As shown in FIG. 9, the base station may be applied to the system shown in FIG. 1, to perform a function of the network device in the foregoing method embodiments. The base station 90 may include one or more radio frequency units, such as a remote radio unit (RRU) 901 and one or more baseband units (baseband unit, BBU) (which may also be referred to as digital units, DU) 902. The RRU 901 may be referred to as a transceiver unit, a transceiver machine, a transceiver circuit, a transceiver, or the like, and may include at least one antenna 9011 and a radio frequency unit 9012. The RRU 901 is mainly configured to receive and send a radio frequency signal and convert a radio frequency signal and a baseband signal, for example, configured to send, to the terminal device, at least one message such as the measurement configuration information in the foregoing embodiment and a response including information about a new secondary cell. The BBU 902 is mainly configured to: perform baseband processing, control the base station, and so on. The RRU 901 and the BBU 902 may be physically disposed together, or may be physically separated, that is, in a distributed base station.

The BBU 902 is a control center of the base station, may also be referred to as a processing unit, and is mainly configured to complete a baseband processing function such as channel coding, multiplexing, modulation, or spreading. For example, the BBU (the processing unit) 902 may be configured to control the base station to perform the operation procedure of the network device in the foregoing method embodiments.

In an example, the BBU 902 may include one or more boards, and a plurality of boards may jointly support a radio access network (such as an LTE network) of a single access standard, or may separately support radio access networks (such as an LTE network, a 5G network, and another network) of different access standards. The BBU 902 further includes a memory 9021 and a processor 9022. The memory 9021 is configured to store a necessary instruction and necessary data. For example, the memory 9021 stores at least one of the measurement configuration information in the foregoing embodiments, information about an original master network device of the terminal device, information about an original secondary network device of the terminal device, information about a new master network device of the terminal device, information about a new secondary network device of the terminal device, context information of the terminal device, and the like. The processor 9022 is configured to control the base station to perform a necessary action, for example, is configured to control the base station to perform an operation procedure related to the network device in the foregoing method embodiments. The memory 9021 and the processor 9022 may serve one or more boards. In other words, a memory and a processor may be independently disposed on each board. Alternatively, a plurality of boards may share a same memory and a same processor. In addition, a necessary circuit may further be disposed on each board.

Figure 10:
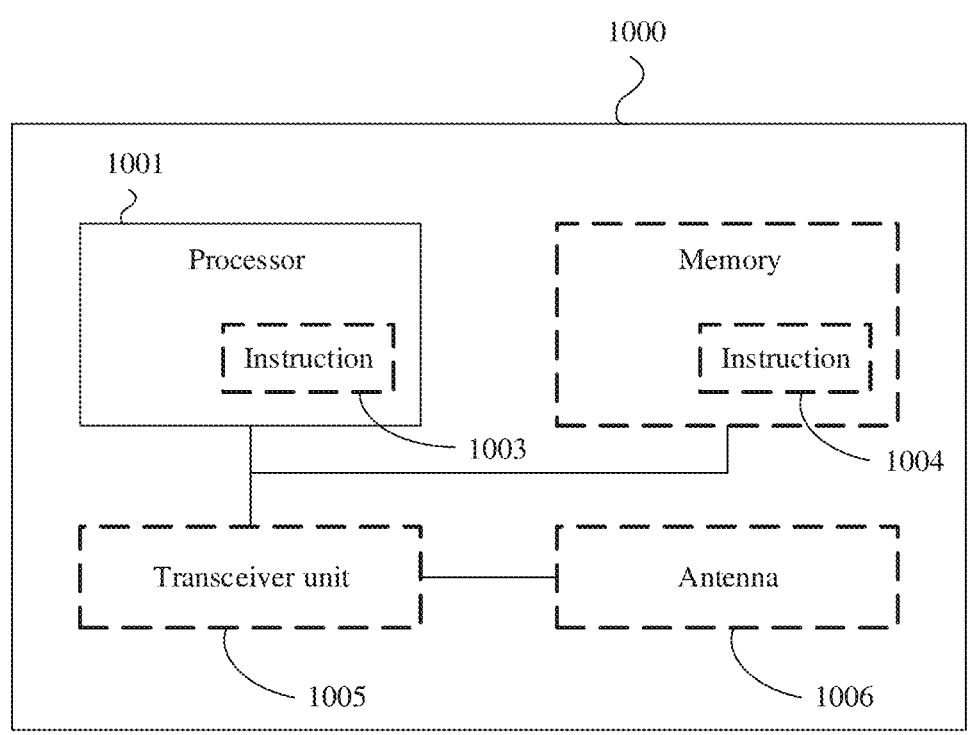
FIG. 10 is a schematic structural diagram of a communications apparatus according to an embodiment of this application.

FIG. 10 is a schematic structural diagram of a communications apparatus according to an embodiment of this application. The communications apparatus 1000 may be configured to implement the methods described in the foregoing method embodiments. For details, refer to the descriptions in the foregoing method embodiments. The communications apparatus 1000 may be a chip, a network device (for example, a base station), a terminal device, another network device, or the like.

The communications apparatus 1000 includes one or more processors 1001. The processor 1001 may be a general-purpose processor, a dedicated processor, or the like, for example, may be a baseband processor or a central processing unit. The baseband processor may be configured to process a communications protocol and communications data. The central processing unit may be configured to: control the communications apparatus (for example, a base station, a terminal, or a chip), execute a software program, and process data of the software program. The communications apparatus may include a transceiver unit that is configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 1000 includes one or more processors 1001. The one or more processors 1001 may implement the methods performed by the network device in the embodiments shown in FIG. 2 to FIG. 7A, FIG. 7B, and FIG. 7C.

In a possible design, the communications apparatus 1000 includes a component (means) configured to send a request for requesting context information of a terminal device and a component (means) configured to receive context information of the terminal device on the second network device and/or the third network device. One or more processors may be used to implement functions of the means for sending the request used to request the context information of the terminal device and functions of the means for receiving the context information of the terminal device on the second network device and/or the third network device. For example, the first request may be sent by using a transceiver, an input/output circuit, or an interface of a chip, and the context information of the terminal device on the second network device and/or the third network device may be received by using a transceiver, an input/output circuit, or an interface of a chip. For the first request and the context information of the terminal device on the second network device and/or the third network device, refer to related descriptions in the foregoing method embodiments.

In a possible design, the communications apparatus 1000 includes a component (means) configured to receive the first request, and a component (means) configured to send the context information of the terminal device on the second network device and the third network device. For the first request and how to obtain the context information of the terminal device on the second network device and the third network device, refer to related descriptions in the foregoing method embodiments. For example, the first request and the context information of the terminal device on the second network device and the third network device may be received by using a transceiver, an input/output circuit, or an interface of a chip.

The one or more processors 1001 included in the communications apparatus 1000 may further implement the methods performed by the terminal device in the embodiments shown in FIG. 2 to FIG. 7A, FIG. 7B, and FIG. 7C.

In a possible design, the communications apparatus 1000 includes a component (means) configured to send a request including measurement indication information and a component (means) configured to receive a response including information about a new secondary cell. For the request including the measurement indication information and the response about how to obtain the information about the new secondary cell, refer to related descriptions in the foregoing method embodiments. For example, the request including the measurement indication information may be sent by using a transceiver, an input/output circuit, or an interface of a chip, and the response including the information about the new secondary cell may be received by using a transceiver, an input/output circuit, or an interface of a chip.

Optionally, the processor 1001 may further implement another function in addition to the method in any one of the embodiments shown in FIG. 2 to FIG. 7A, FIG. 7B, and FIG. 7C.

Optionally, in a design, the processor 1001 may alternatively include an instruction 1003. The instruction may be run on the processor, so that the communications apparatus 1000 performs the methods described in the foregoing method embodiments.

In another possible design, the communications apparatus 1000 may alternatively include a circuit. The circuit may implement a function of the network device or the terminal device in the foregoing method embodiments.

In another possible design, the communications apparatus 1000 may include one or more memories 1002 that store an instruction 1004. The instruction may be run on the processor, so that the communications apparatus 1000 performs the methods described in the foregoing method embodiments. Optionally, the memory may also store data. Optionally, the processor may also store an instruction and/or data. For example, the one or more memories 1002 may store at least one of the measurement configuration information described in the foregoing embodiments, information about an original master network device of the terminal device, information about an original secondary network device of the terminal device, information about a new master network device of the terminal device, information about a new secondary network device of the terminal device, context information of the terminal device, and the like. The processor and the memory may be disposed separately, or may be integrated together.

In another possible design, the communications apparatus 1000 may further include a transceiver unit 1005 and an antenna 1006. The processor 1001 may be referred to as a processing unit, and controls the communications apparatus (the terminal or the base station). The transceiver unit 1005 may be referred to as a transceiver machine, a transceiver circuit, a transceiver, or the like, and is configured to implement a transceiver function of the communications apparatus by using the antenna 1006.

This application further provides a communications system, including one or more of the foregoing network devices and one or more of the foregoing terminal devices.

It should be understood that the processor in the embodiments of this application may be a central processing unit (CPU), or may be another general-purpose processor, a digital signal processor (DSP), an application-specific integrated circuit (ASIC), a field programmable gate array (FPGA), or another programmable logical device, a discrete gate or a transistor logical device, a discrete hardware component, or the like. The general-purpose processor may be a microprocessor, any conventional processor, or the like.

It may further be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example and not limitative description, many forms of random access memories (RAM) RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement the embodiments, all or some of the foregoing embodiments may be implemented in a form of computer program product. The computer program product includes one or more computer instructions or computer programs. When the program instructions or the computer programs are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired or a wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

In this application, "at least one" means one or more, and "a plurality of" means two or more. "At least one item (piece) of the following" or a similar expression thereof refers to any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

It should be understood that the terminal device 800 shown in FIG. 8 can implement the processes of the terminal device in the method embodiments in FIG. 2 to FIG. 7A, FIG. 7B, and FIG. 7C. Operations and/or functions of modules in the terminal device 800 are separately intended to implement corresponding procedures in the method embodiments in FIG. 2 to FIG. 7A, FIG. 7B, and FIG. 7C. For details, refer to the descriptions in the foregoing method embodiments. To avoid repetition, detailed descriptions are properly omitted herein.

It should be understood that the network device 900 shown in FIG. 9 can implement the processes of the network device in the method embodiments in FIG. 2 to FIG. 7A, FIG. 7B, and FIG. 7C. Operations and/or functions of modules in the network device 900 are separately intended to implement corresponding procedures in the method embodiments in FIG. 2 to FIG. 7A, FIG. 7B, and FIG. 7C. For details, refer to the descriptions in the foregoing method embodiments. To avoid repetition, detailed descriptions are properly omitted herein.

It should be understood that the processor in the embodiments of this application may be implemented by using a processing unit or a chip. Optionally, a transceiver may include a transmitter and a receiver, or include a transceiver unit. The embodiments of this application are not limited thereto.

It should be noted that the processor (such as the processor in FIG. 8 or the processor 9022 in FIG. 9) in the embodiments of this application may be an integrated circuit chip, and has a signal processing capability. In an implementation process, the steps in the foregoing method embodiments may be completed by using a hardware integrated logical circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, any conventional processor, or the like. Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory (such as the memory in FIG. 8 or the memory 9021 in FIG. 9) in the embodiments of this application may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM) that is used as an external cache. By way of example and not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these types of memories and any memory of another proper type.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

All or some of the foregoing embodiments may be implemented by using software, hardware, firmware, or any combination thereof. When software is used to implement the embodiments, all or some of the embodiments may be implemented in a form of computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (Digital Video Disc, DVD), a semiconductor medium (for example, a solid-state drive (SSD)), or the like.

An embodiment of this application further provides a processing apparatus, including a processor and an interface. The processor is configured to perform the communication method in any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general purpose processor. The general purpose processor is implemented by reading software code stored in a memory. The memory may be integrated into the processor, may be located outside the processor, or may exist independently.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular characteristics, structures, or features may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation to the implementation processes of the embodiments of this application.

In addition, the terms "system" and "network" in this specification may be often interchangeably used in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and that B may be determined based on A. However, it should further be understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example based on functions. Whether the functions are performed by hardware or software depends on a particular application and a design constraint of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

According to the descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, another compact disc storage or magnetic disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination should also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method, performed by a first network device or a chipset configured to be disposed in the first network device, comprising:
receiving, from a second network device, first indication information, the first indication information comprising information indicating a third network device, the second network device being an original master network device of a terminal device in a connected state before the first network device receiving the first indication information, the third network device being an original secondary network device of the terminal device in the connected state, the first network device being a new master network device of the terminal device in an inactive state after the second network device being the original master network device of the terminal device in the connected state; and
determining the third network device to be a new secondary network device of the terminal device in the inactive state after the second network device being the original master network device of the terminal device in the connected state based on the first indication information.

2. The method according to claim 1, further comprising:
sending, to the second network device, a first request, the first request comprising a request for context information of the terminal device on the second network device; and receiving, from the second network device, the context information of the terminal device on the second network device.

3. The method according to claim 2, wherein the first indication information and the context information of the terminal device on the second network device are in a same message.

4. The method according to claim 1, further comprising:
receiving, from the second network device, a second request, the second request indicating a request to page the terminal device; and
sending, to the second network device, a response, the response indicating that the first network device has successfully paged the terminal device.

5. The method according to claim 1, further comprising:
sending, to the third network device, a resume terminal context request, the resume terminal context request comprising an identifier of the terminal device.

6. The method according to claim 1, further comprising:
receiving, from the third network device, a resume terminal context response.

7. An apparatus, the apparatus being a first network device or a chipset configured to be disposed in the first network device, the apparatus comprising:
a processor; and
a non-transitory memory storing a program to be executed in the processor, the program comprising instructions, when executed, cause the processor to:
receive, from a second network device, first indication information, the first indication information comprising information indicating a third network device, the second network device being an original master network device of a terminal device in a connected state, the third network device being an original secondary network device of the terminal device in the connected state before the first network device receiving the first indication information, the first network device being a new master network device of the terminal device in an inactive state after the second network device being the original master network device of the terminal device in the connected state; and
determine the third network device to be a new secondary network device of the terminal device in the inactive state after the second network device being the original master network device of the terminal device in the connected state based on the first indication information.

8. The first network device according to claim 7, wherein the program further comprises instructions, when executed, cause the processor to:
send, to the second network device, a first request, the first request comprising a request for context information of the terminal device on the second network device; and
receive, from the second network device, the context information of the terminal device on the second network device.

9. The first network device according to claim 8, wherein the first indication information and the context information of the terminal device on the second network device are in a same message.

10. The first network device according to claim 7, wherein the program further comprises instructions, when executed, cause the processor to:
receive, from the second network device, a second request, the second request indicating a request to page the terminal device; and
send, to the second network device, a response, the response indicating that the first network device has successfully paged the terminal device.

11. The first network device according to claim 7, wherein the program further comprises instructions, when executed, cause the processor to:
send, to the third network device, a resume terminal context request, and the resume terminal context request comprises an identifier of the terminal device.

12. A method, performed by a system comprising a first network device and a second network device, the method comprising:
receiving, by the second network device from the first network device, a first request, the first request comprising a request for context information of a terminal device on the second network device;
sending, by the second network device to the first network device, the context information of the terminal device on the second network device; and
sending, by the second network device to the first network device, first indication information, the first indication information comprising information indicating a third network device, the third network device being an original secondary network device of the terminal device in a connected state, the second network device being an original master network device of the terminal device in the connected state before the second network device sending the first indication information, and the first network device being a new master network device of the terminal device in an inactive state after the second network device being the original master network device of the terminal device in the connected state.

13. The method according to claim 12, wherein the first indication information and the context information of the terminal device on the second network device are in a same message.

14. The method according to claim 12, further comprising:
sending, by the second network device to the first network device, a second request, the second request indicating a request to page the terminal device; and
receiving, by the second network device from the first network device, a response, the response indicating that the first network device has successfully paged the terminal device.

15. An apparatus, being a second network device or a chipset configured to be disposed in the second network device, comprising:
a processor; and
a non-transitory memory storing a program to be executed in the processor, the program comprising instructions, when executed, cause the processor to:
receive, from a first network device, a first request, the first request comprising a request for context information of a terminal device on the second network device;
send, to the first network device, the context information of the terminal device on the second network device; and
send, to the first network device, first indication information, the first indication information comprising information indicating a third network device, the third network device being an original secondary network device of the terminal device in a connected state, the second network device being an original master network device of the terminal device in the connected state before the second network device sending the first indication information, and the first network device being a new master network device of the terminal device in an inactive state after the second network device being the original master network device of the terminal device in the connected state.

16. The apparatus according to claim 15, wherein the first indication information and the context information of the terminal device on the second network device are in a same message.

17. The apparatus according to claim 15, wherein the program further comprises instructions, when executed, cause the processor to
- send, to the first network device, a second request, the second request indicating a request to page the terminal device; and
- receive, from the first network device, a response, the response indicating that the first network device has successfully paged the terminal device.

* * * * *

UNITED STATES PATENT AND TRADEMARK OFFICE
CERTIFICATE OF CORRECTION

| | |
|---|---|
| PATENT NO. | : 11,690,116 B2 |
| APPLICATION NO. | : 17/104633 |
| DATED | : June 27, 2023 |
| INVENTOR(S) | : Geng et al. |

It is certified that error appears in the above-identified patent and that said Letters Patent is hereby corrected as shown below:

In the Claims

Claim 8, Column 49, Line 49; delete "first network device" and insert --apparatus--.

Claim 9, Column 49, Line 58; delete "first network device" and insert --apparatus--.

Claim 10, Column 49, Line 62; delete "first network device" and insert --apparatus--.

Claim 11, Column 50, Line 4; delete "first network device" and insert --apparatus--.

Signed and Sealed this
Fifth Day of September, 2023

Katherine Kelly Vidal
*Director of the United States Patent and Trademark Office*